US006765197B2

(12) United States Patent
Piestrup et al.

(10) Patent No.: US 6,765,197 B2
(45) Date of Patent: Jul. 20, 2004

(54) METHODS OF IMAGING, FOCUSING AND CONDITIONING NEUTRONS

(75) Inventors: Melvin A. Piestrup, Woodside, CA (US); Richard H. Pantell, Portola Valley, CA (US); Hector R. Beguiristain, Oakland, CA (US)

(73) Assignee: Adelphi Technology Inc., Redwood City, CA (US)

( * ) Notice: Subject to any disclaimer, the term of this patent is extended or adjusted under 35 U.S.C. 154(b) by 0 days.

(21) Appl. No.: 09/965,501

(22) Filed: Sep. 27, 2001

(65) Prior Publication Data

US 2002/0148956 A1 Oct. 17, 2002

Related U.S. Application Data

(60) Provisional application No. 60/235,698, filed on Sep. 27, 2000, provisional application No. 60/274,490, filed on Mar. 8, 2001, and provisional application No. 60/274,556, filed on Mar. 8, 2001.

(51) Int. Cl.[7] .............................. R01S 1/00; R01S 3/00; G02B 5/00; G21K 1/00; H01J 1/52

(52) U.S. Cl. .................................... 250/251; 250/505.1

(58) Field of Search ............................. 250/251, 505.1; 378/145

(56) References Cited

U.S. PATENT DOCUMENTS 5,880,478 A * 3/1999 Bishop et al. ........... 250/505.1
6,269,145 B1 * 7/2001 Piestrup et al. ............... 378/81

* cited by examiner

*Primary Examiner*—Stephen D. Meier
*Assistant Examiner*—Alfred E Dudding
(74) *Attorney, Agent, or Firm*—Joseph H. Smith

(57) ABSTRACT

A compound refractive lens for neutrons is provided having a plurality of individual unit Fresnel lenses comprising a total of N in number. The unit lenses are aligned substantially along an axis, the i-th lens having a displacement $t_i$ orthogonal to the axis, with the axis located such that $$\sum_{i=1}^{N} t_i = 0.$$

Each of the unit lenses comprises a lens material having a refractive index decrement $\delta<1$ at a wavelength $\lambda<200$ Angstroms. In a preferred mode, the lens above is configured such that the displacements $t_i$ are distributed and have a standard deviation $\sigma_t$ of the displacements $t_i$ about the axis, and wherein each of the unit lens has a smallest Fresnel zone width of $s_n-s_{n-1}$, where $s_n$ and $s_{n-1}$ are the zone radii of the n and n−1 zones and the standard deviation is $\sigma_t \leqq [s_n-s_{n-1}]/4$.

16 Claims, 15 Drawing Sheets

METHODS OF IMAGING, FOCUSING AND CONDITIONING NEUTRONS

CROSS-REFERENCE TO RELATED APPLICATIONS

This case claims benefit of priority from U.S. provisional patent application serial No. 60/235,698, filed Sep. 27, 2000, from U.S. provisional patent application serial No. 60/274, 490, filed Mar. 8, 2001, and from U.S. provisional patent application serial No. 60/274,556, filed, Mar. 8, 2001.

GOVERNMENT RIGHTS

This invention was made with Government support under contract DASG60-00-C-0043 awarded by U.S. Army Space and Missile Defense Command. The Government has certain rights in the invention.

BACKGROUND—FIELD OF INVENTION

This invention relates to an apparatus that uses a plurality of one-dimensional, axisymmetric or two-dimensional lenses for the focusing, collection, imaging, and general manipulation of neutrons for medical, industrial and scientific applications.

Background—Compound Refractive Lenses for X-rays

In the literature the collection and focusing of x-rays and neutrons has been accomplished using multiple refractive lenses composed of cylindrical, spherical and parabolic lenses. It has long been known for optics in the visible spectrum that a series of N closely spaced lenses, each having a focal length of $f_1$, has an overall focal length of $f_1/N$ (e.g. F. L. Pedrotti and L. Pedrotti, "Introduction to Optics," Prentice Hall, Chapt. 3. p.60, 1987).

Also in the literature Toshihisa Tomie (U.S. Pat. No. , 5,594,773) and A. Snigirev, V. Kohn, I. Snigireva and B. Lengeler, ("A compound refractive lens for focusing high-energy X-rays, Nature 384, 49 (1996)) have shown that this can also be done in the x-ray region of the spectrum using a series of holes drilled in a common substrate that effectively mimics a linear series of lenses. This "compound refractive x-ray lens" (CRL) is manufactured using N number of unit lenses, each constituted by a series of hollow cylinders or holes that are embedded inside a material capable of transmitting x-rays. Two closely spaced holes form a concave-concave (bi-concave) lens at their closest juncture. N holes result in N unit lenses. For x rays as well as for neutrons, the index of refraction of the material is less than 1; thus, unlike visible light refraction optics, which will cause visible rays to diverge, the bi-concave lens performs in opposite fashion and focuses x-rays and neutrons instead.

Individual Unit Lenses for X-rays

M. A. Piestrup, J. T. Cremer, R. H. Pantell and H. R. Beguiristain (U.S. Pat. No. 6,269,145) have used an array of individual thin lenses without a common substrate but with a common optical axis to form a refractive x-ray lens. These individual unit lenses can be parabolic, spherical, cylindrical or Fresnel. The patent shows that small random displacements of the individual lenses off a common axis will not invariably lead to the lens array failure to collect and focus x-rays. It shows that the prior teachings of Tomie are incorrect concerning the difficulty of achieving collection and focusing from a linear series of individually separate refractive lenses which are slightly displaced from one another. Small random displacement off the average axis of a linear series of lens elements which form a compound refractive lens are shown by Piestrup et al. (U.S. Pat. No. 6,269,145) not to dramatically affect the focal spot size, focal length of the lens, and the lens aperture size. Separate thin lenses are possible since the lenses need not be exactly in contact. This allows the unit lenses to be individually supported by structures that are thicker than the thin lenses, such as a rigid-ring structure. The unit lenses are then separated by a gap that is equal to that of the thickness of the support structure. The addition of the gap does not affect the collection and focusing of the x-rays as long as we can assume the thin lens formula assumption is still correct ($f \gg l$), where l is the length of the CRL including the gaps between the unit lenses and f is the focal length of the CRL. The lens will still work if the CRL is thick ($f \approx l$), but the simple formula for the focal length must be modified.

In the literature a closely-spaced series of N bi-concave lenses each of focal length $f_1$ results in a focal length f of:

$$f = \frac{f_1}{N} = \frac{R}{2N\delta}. \tag{1}$$

The unit lens focal length $f_1$ is given by:

$$f_1 = \frac{R}{2\delta}, \tag{2}$$

where the complex refractive index of the unit lens material is expressed by:

$$n = 1 - \delta + i\left(\frac{\lambda}{4\pi}\right)\mu, \tag{3}$$

R is the radius of curvature of the lens, λ is the neutron wavelength and μ is the linear attenuation coefficient of in the lens material. For cylindrical lenses $R=R_h$, the radius of the cylinder, for spherical lenses $R=R_s$, the radius of the sphere; for the case of parabolic unit lenses $R=R_p$, the radius of curvature at the vertex of the paraboloid.

The aperture of the lens array is limited. This is due to increased absorption at the edges of the lens as the lens shape may be approximated by a paraboloid of revolution that increases thickness in relation to the square of the distance from the lens axis. These effects make the compound refractive lens act like an iris as well as a lens. For a radius $R = R_h$, $R_s$, or $R_p$, the absorption aperture radius $r_a$ is given by Tomie and Snigirev et al. to be:

$$r_a = \left(\frac{2R}{\mu N}\right)^{\frac{1}{2}} = \left(\frac{4\delta f}{\mu}\right)^{\frac{1}{2}}. \tag{4}$$

If the lenses refract with spherical surfaces, only the central region of the lens approximates the required paraboloid of revolution shape of an ideal lens. The parabolic aperture radius $r_p$ where there is a π phase change from the phase of an ideal paraboloid of revolution given by:

$$r_p = 2((Nf\delta)^2\lambda r_i)^{\frac{1}{4}} \approx 2((N\delta)^2 f^3\lambda)^{\frac{1}{4}} \tag{5}$$

where $r_i$ is the image distance and λ is the X-ray wavelength. Rays outside this aperture do not focus at the same point as those inside. The approximation in (5) is true for a source placed at a distance much bigger than f. For imaging the effective aperture radius $r_e$ is the minimum of the absorption aperture radius, $r_a$, and the parabolic aperture radius, $r_p$, and the mechanical aperture radius $r_h=R_h$; that is:

$$r_e=MIN(r_a, r_p, r_h). \tag{6}$$

As shown by Piestrup et al, the compound refractive lens made of spherical, parabolic and cylindrical unit lenses can tolerate a small random displacement of the individual lens elements off the average axis. This is shown in FIG. 1 wherein unit bi-concave lenses 9 are aligned as carefully as possible, but, due to unavoidable error, each has a displacement of $t_i$ off the mean optical axis 8 of all the unit lenses. In order to keep an adequate aperture, the root mean square, $\sigma_t$, of the average displacement of the unit lenses off the average optical axis of the unit lenses should be less than the effective aperture radius of the individual lenses or:

$$\sigma_t<r_e \tag{7}$$

As shown by Piestrup et al. (U.S. Pat. No. 6,269,145), the aperture is reduced somewhat when there is random variation of the unit lenses off the average optical axis of the lenses.

Piestrup et al (U.S. Pat. No. 6,269,145) also showed that if a refractive Fresnel lens is utilized for x-rays, absorption can be minimized and a large aperture can be achieved. Indeed, the aperture radius of the lens can be the mechanical aperture radius, $r_m$. However, because there must be phase addition of the x-rays between each Fresnel zone, the standard deviation of each unit Fresnel lens must not be larger than the width of the smallest zone that is $s_m-s_{m-1}$. Piestrup et al. (U.S. Pat. No. 6,269,145) shows that the requirement is $\sigma_t\leqq(s_m-s_{m-1})/4$. This is a more stringent requirement than the ordinary spherical, parabolic or cylindrical lenses. To cover most applications for x-rays where the Fresnel lens would still practically work with minor loss, Piestrup et al. (U.S. Pat. No. 6,269,145) required that $\sigma_t\leqq(s_m-s_{m-1}$.

Background—Compound Refractive Lenses for Neutrons

R. Gähler, J. Kalus, and W. Mampe (*Phys. Rev. D* 25, 2887, 1982) use a neutron compound lens system (two unit lenses) to measure the electric charge of neutrons. This same setup is used as a practical example of lenses in neutron optics by Varley F. Sears, (*Neutron Optics,* Ch. 3, p 73–74, Oxford University Press, 1989). This reference clearly states that the compound refractive lens focal length f of the system of two unit lenses each of focal length $f_i$ is reduced by the number of unit lenses of the compound system i.e. $f=f_i/2$.

It is known in the art that the collection and focusing of neutrons can be accomplished using multiple refractive lenses composed of cylinders, spherical and parabolic lenses. D. J. Bishop et al. (U.S. Pat. No. , 5,880,478) have shown that focusing of neutrons can be done using a series of unit lenses. No mention of the importance of the alignment of these lenses is given. This issue of the effect of small random displacements of the individual lenses off a common axis on the collection and focusing of neutrons is not discussed for these simple double concave lenses. As in Piestrup et al, U.S. Pat. No. 6,269,145, these lenses can be separate, without a common substrate. These lenses are concave and either spherical or parabolic in shape.

Background—Neutron Microscope

In the art there is a class of microscopes that uses neutron mirrors with ultra-cold neutrons, wavelengths around 396 Å, and very cold neutrons, wavelengths around 40 Å to image samples from reflections on neutron mirror curved surfaces as described by A. I Frank in the Proceedings of the SPIE v1738, 1992, Bellingham, Wash., USA p323–334.

Background—Achromatic X-ray Compound Refractive Lenses

In the literature of M. A. Piestrup, J. T. Cremer, R. H. Pantell and H. R. Beguiristain (U.S. Pat. No. 6,269,145), x-ray compound refractive lenses are capable of having close to identical focal length over large variations in x-ray photon energy. This is achieved by placing the lenses an appropriate distance, d, apart. Achromatic neutron lens arrays can be constructed in the same fashion analogous to x-ray compound refractive lenses.

Background—Neutron Monochromator

Currently, the most favored methods for monochromatizing neutron beams are mechanical methods and neutron reflection and diffraction from multilayer mirrors, multichannel “lenses”, and most notably Bragg reflection-diffraction from crystals.

a. Mechanical Neutron Monochromator

It is known in the art to use mechanical methods that take advantage of the kinetic energy of the neutrons for filtering them. One example of a mechanical monochromator was demonstrated by S. M. Kalebin, G. V. Rukolaine, A. N. Polozov, V. S. Artamonov, R. N. Ivanov and V. S. Chemishov, (“Neutron monochromator with five synchronously rotating rotors suspended in a magnetic field,” Nucl. Inst. Meth. Phys. Res., Sect. A vol. 267 pp. 35–40) has five neutron choppers consisting of rotary discs having apertures for pulsing, or chopping, a neutron beam. It produces short pulses at high repetition rates of high intensity monochromatic neutrons. Such devices are expensive to construct and maintain and are limited with respect to changing pulse duration and rate for a given neutron wavelength.

b. Neutron Monochromators that use Reflections and Diffraction From Different Surfaces Earlier methods include the pulsed-neutron monochromator described by Herbert A. Mook (U.S. Pat. No. 4,543,230) where a row of crystals that reflect neutrons intercepts a beam of neutrons and reflect onto a common target. The crystals in the row define progressively larger neutron-scattering angles and are vibrated sequentially in descending order with respect to the size of their scattering angles, thus generating neutron pulses that arrive simultaneously at the target. Other monochromators are also known that use nearly perfect single crystals of silicon, silicon dioxide, quartz and the like which could be bent. In some monochromators, a row of crystals is disposed in a neutron beam, with the crystals positioned to reflect continuous beams of neutrons onto a common target. The various crystals are oriented to define increasingly large scattering angles throughout the row in order to increase the intensity of the Bragg reflected-diffracted beams. Such monochromators are incapable of distinguishing between elastically and inelastically scattered neutrons.

It is also known to use monochromators with multilayer mirrors as described by B. P. Schoenborn and D. L. Caspar (U.S. Pat. No. 3,885,153). Multilayered mirrors are resonant structures where the spacing of the layers is such that the multiple reflections from material interfaces add in phase or constructively interfere much in the same way as Bragg reflection-diffractions do from crystal planes as described above.

It is also known to use multi-channel “lenses” monochromator described by S. W. Wilkins (U.S. Pat. No. 5,016,267). Multi-channel lenses are not rigorously lenses as they rely on reflection and not refraction, as common lenses do, for achieving focusing. They are formed by a number of channels where neutrons are directed by reflection to form a collimated beam or onto a "focal" spot whose size is limited by the size of the channels of the device. They have been proposed for monochromatizing and collimating neutron beams but have not been adopted widely for such effects.

SUMMARY OF THE INVENTION

In accordance with preferred embodiments of the invention, a compound refractive lens for neutrons is provided having a plurality of individual unit Fresnel lenses comprising a total of N in number, the unit lenses hereinafter designated individually with numbers i=l through N. The unit lenses are aligned substantially aligned along an axis, the i-th lens having a displacement $t_i$ orthogonal to said axis, with the axis located such that $$\sum_{i=1}^{N} t_i = 0.$$

Each of the unit lenses comprises a lens material having a refractive index decrement $\delta<1$ at a wavelength $\lambda<200$ Angstroms. In a preferred mode, the neutron compound refractive lens above is configured such that the displacements $t_i$ are distributed such that there is a standard deviation $\sigma_t$ of the displacements $t_i$ about the axis, wherein each of the unit lens has n zones, and wherein each of the unit lens has a smallest Fresnel zone width of $s_n-s_{n-1}$, where $s_n$ and $s_{n-1}$ are the zone radii of the n and n−1 zones and the standard deviation is $\sigma_t \leqq [s_n-s_{n-1}]/4$.

a. Fresnel Lenses

The Fresnel configuration of the present invention shortens the length of the neutron compound refractive lens and increases the aperture of the lens while reducing the attenuation through it. This, in turn, increases the lens' gain and collection efficiency. In addition, increasing the aperture size of the neutron lens increases the lens resolution when the compound neutron lens is used for imaging. The present invention also reduces diffuse scattering (mostly resulting in neutron energy change) of the neutrons passing through the lens thereby reducing overall background noise due to incoherently scattered neutrons.

b. Neutron Monochromator

In another embodiment a new type of monochromator is made by combining a neutron compound refractive lens with an aperture positioned at the image point of the lens. This increases the available neutron beam flux compared to those obtained from other types of neutron monochromators, as there is an increased gain from the use of a neutron refractive lens compared to reflection efficiencies and aperture optics used in the other instruments. The present invention provides for a simplified and inexpensive configuration of passive lenses. Also, the present invention provides for a dual-purpose instrument capable of collimating and monochromatizing neutron beams when used in the appropriate design configuration. In addition, the present invention provides differentiation between coherently focused neutrons and incoherently scattered ones. Further, the present invention provides steady-state high intensity neutron beams when used with a steady state source or pulsed high intensity neutron beams if either a pulsed neutron source is used, or if high repetition rate shutter is placed downstream from the neutron source or after the instrument.

c. Neutron Microscope

In a preferred embodiment, a neutron microscope is assembled (preferably for neutrons below 100 Å in wavelength) that includes a conventional source of neutrons, a neutron condensing optic that focuses neutrons on a specimen and, a neutron compound refractive lens that images with high resolution the specimen under investigation onto a neutron detector.

To illuminate specimens, use is made of conventional sources of neutrons such as nuclear reactors or spallation sources. One embodiment uses a condensing optic that maximizes the neutron flux delivered to the sample. The condensing optic may either be a reflective optic such as a curved neutron mirror or a neutron compound refractive lens. In an embodiment where a polychromatic source is used, a compound refractive lens condenser, in combination with a suitably placed diaphragm, monochromatizes the neutron beam and focuses on the specimen thereby maximizing the available neutron flux on the sample. In this embodiment the efficiency of the condenser illumination can be optimized with one optical element using "critical illumination" (as opposed to so called Kohler illumination that employs more than one optical element). "Critical illumination" directly images the neutron source on the specimen.

In some embodiments the compound refractive lens that images the specimen onto the detector can be made to be achromatic. By doing so, this optic is the least affected by neutron beam bandwidth illuminating the specimen. Thus, the neutron compound refractive lens will produce high-resolution images of the specimen with no appreciable chromatic aberration from the neutron beam. The ability to make an achromatic compound refractive neutron lens is important so that relatively wide bandwidth neutron beams (typically between 1% and 10% bandwidths) can be used. Indeed, it is typically the case that these neutron CRLs should be made achromatic in order to achieve higher resolution. This can be done by properly spacing two compound refractive lenses.

Film or a neutron-sensitive two-dimensional detector can be used to observe the images of the specimen formed at the image plane. As one skilled in the art knows, there are other methods of recording the image.

In one embodiment the above conventional microscope that images objects in amplitude contrast can be converted into a microscope that images objects in phase contrast. In this manner, the present invention makes visible features in the specimen, which are not seen otherwise in amplitude contrast. This produces improved high-contrast images in regions of the specimen having low-amplitude-contrast surroundings. This embodiment produces phase-contrast images that will enhance research performed in biology, medicine, physical sciences and industry.

The conversion from an amplitude-contrast to a phase-contrast instrument is achieved by using either an annular condenser optic or an annular diaphragm on the condenser optic, such that the specimen is illuminated with an annular beam. A compound refractive lens then images this specimen with high resolution on to a neutron detector, which stores the image. A phase plate is placed in the rear focal plane of this compound refractive lens at the conjugate plane or at the transform plane of the annular condenser. The phase plate typically applies a 90° or 270° phase shift to the zero-order neutron rays coming from the specimen with respect to the rest of the neutron rays deflected by the sample. The thickness and material of the phase plate determine the phase shift introduced by the phase ring. A phase plate is placed in the conjugate or transform plane of the neutron objective where, if there were no diffraction from the specimen, the neutron rays would be focused to form an image of the condenser optic or annular diaphragm on the plate. On this phase plate there is a ring layer or a channel that matches the image of the condenser optic or annular diaphragm that introduces the 90° or 270° phase shift to the zero order neutron rays coming from the specimen.

DRAWING FIGURES

Figure 12A:
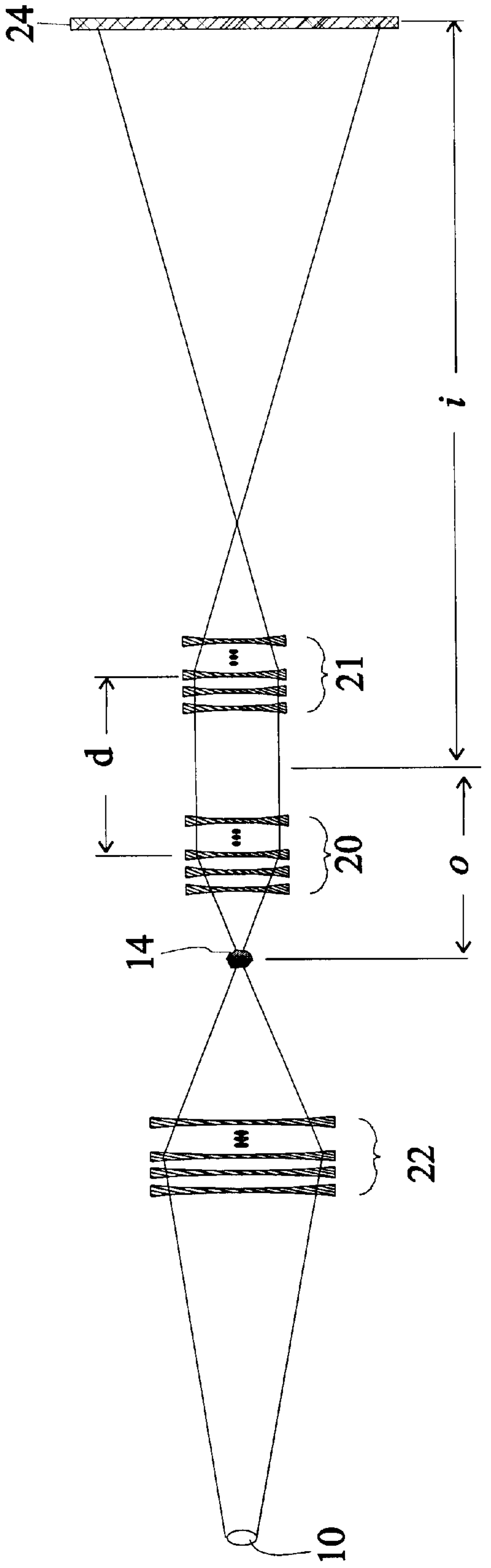

FIG. 12*a* shows a schematic diagram of a neutron microscope with a condenser optic that produces images through an amplitude contrast technique.

Figure 12B:
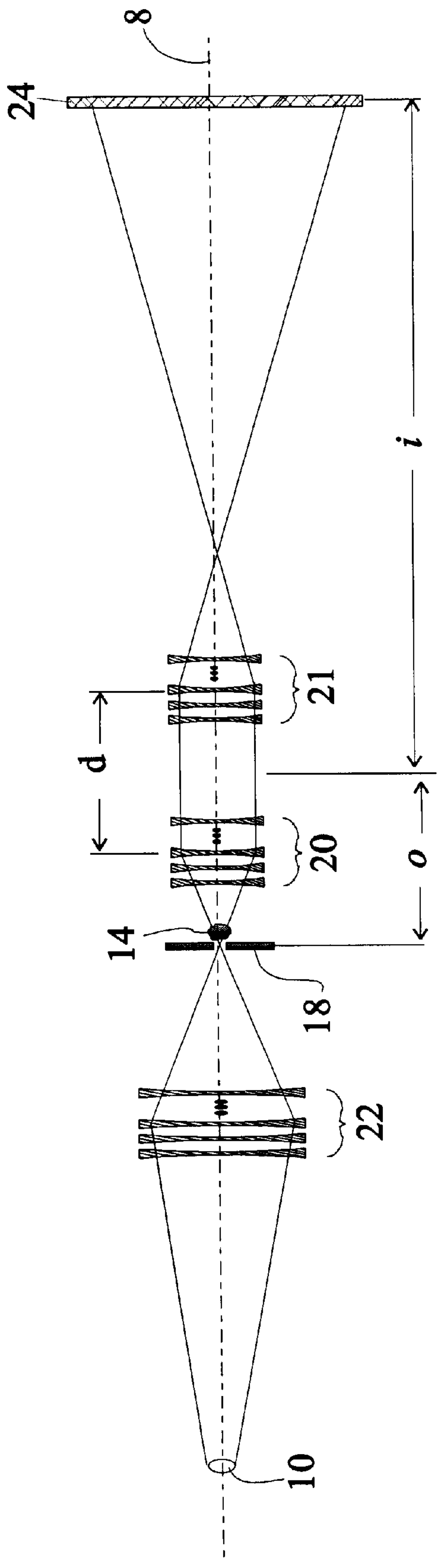

FIG. 12*b* shows a schematic diagram of a neutron microscope with a lens monohromator.

Figure 13:
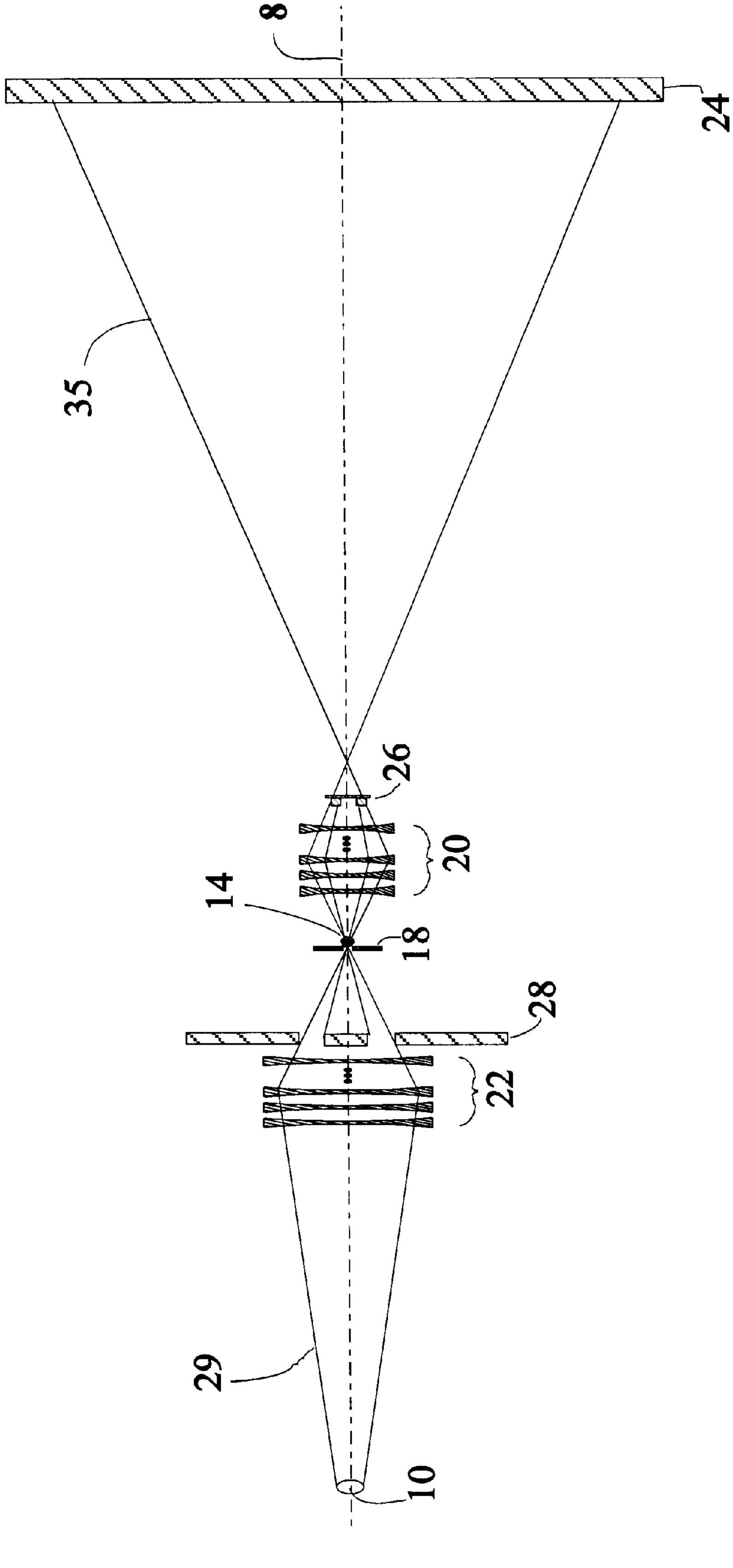

FIG. 13 shows a schematic diagram of a neutron microscope that produces images through phase contrast technique.

Figure 14:
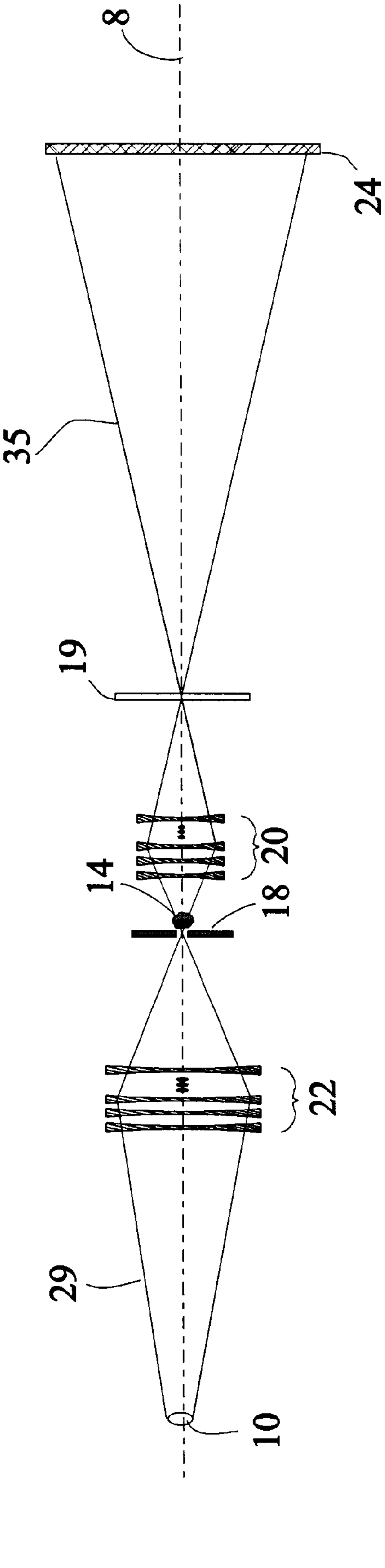

FIG. 14 shows a schematic diagram of a neutron microscope that produces images through a combination of amplitude contrast and phase contrast techniques.

DETAILED DESCRIPTION OF THE PREFERRED EMBODIMENTS

Figure 1:
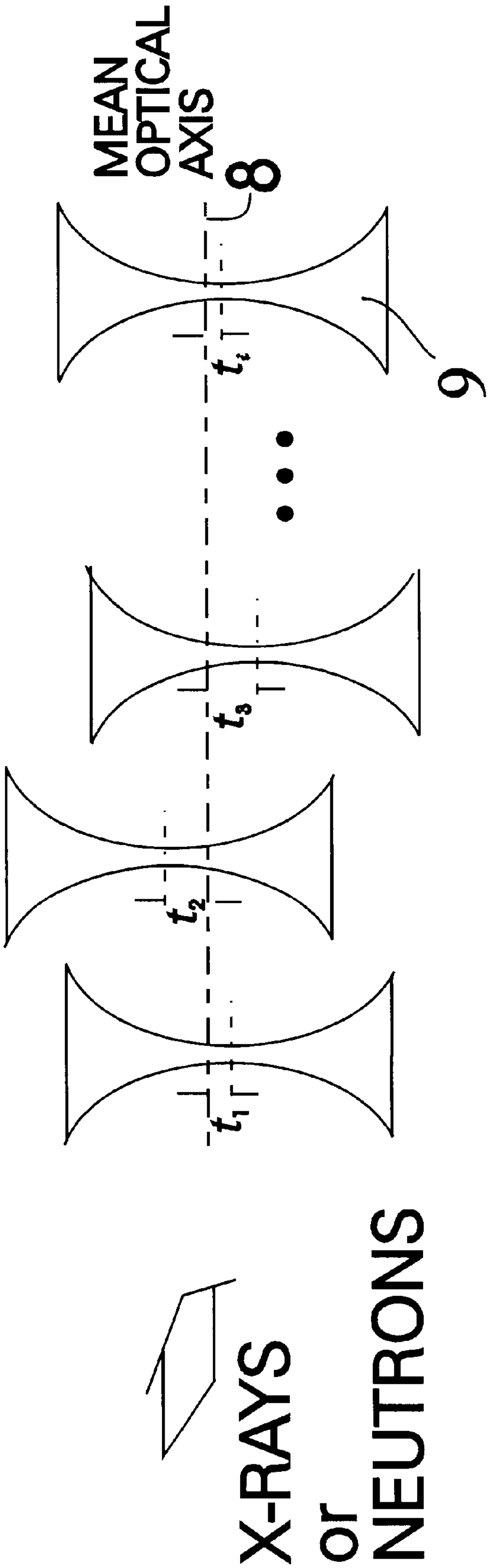
PRIOR ART FIG. 1
FIG. 1 shows a prior art concept for a linear series of concave unit lenses to make a compound refractive lens.
Figure 2:
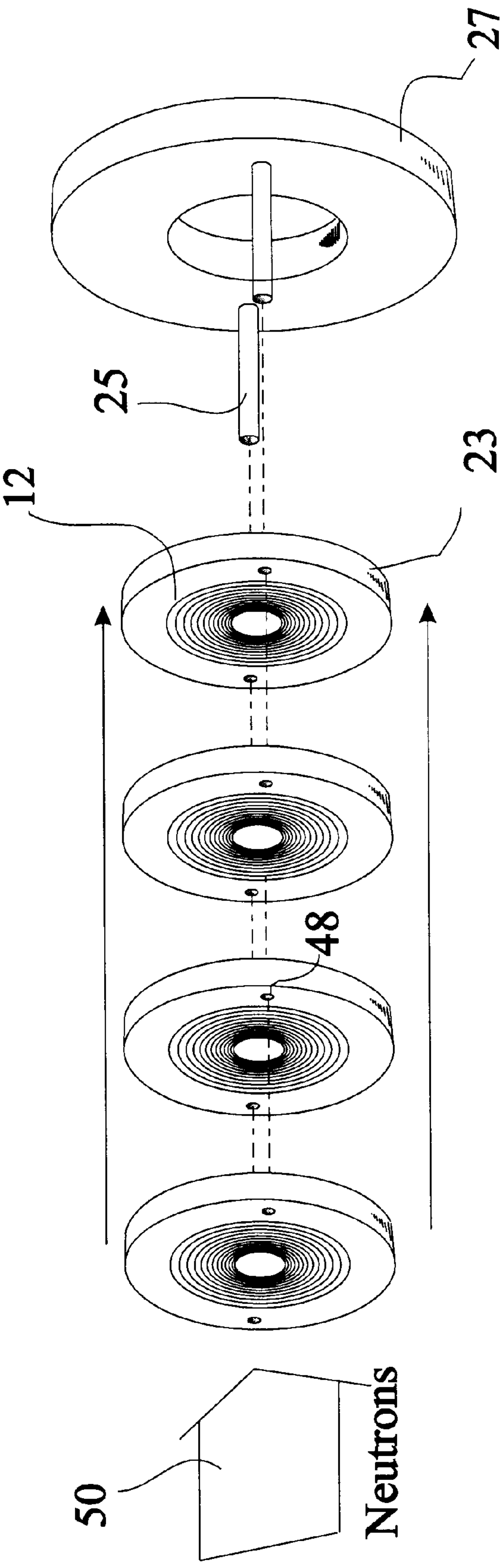
FIG. 2 shows an exploded view of linear series of thin Fresnel lenses supported and aligned concentrically using alignment pins.
Figure 3:
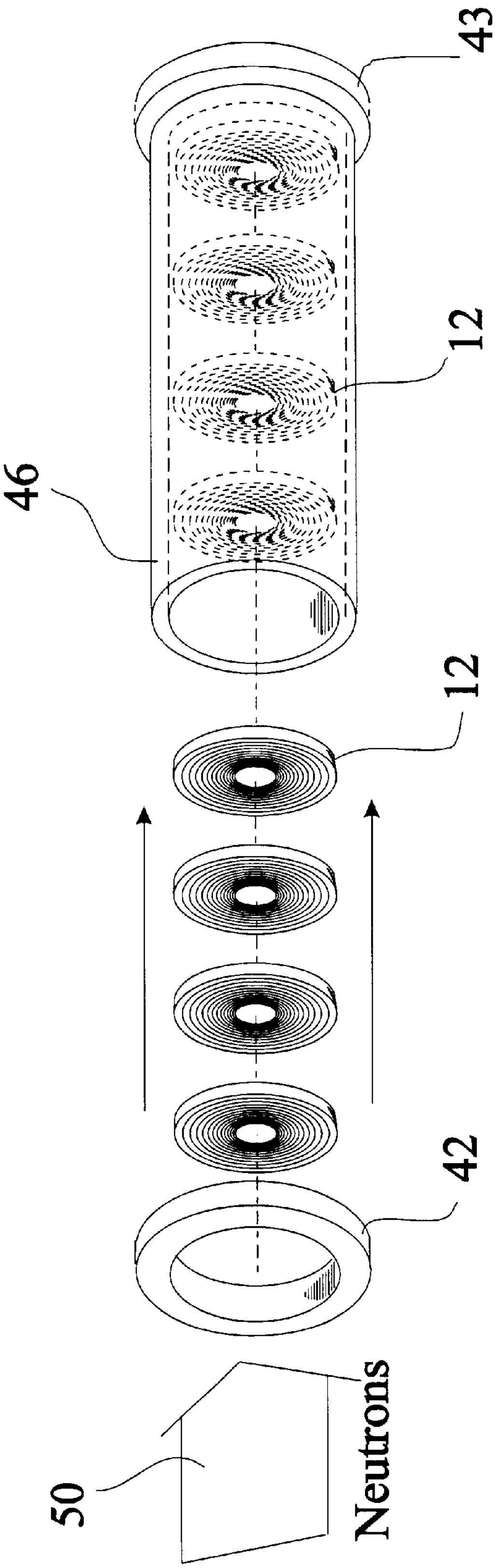
FIG. 3 shows an exploded view of linear series of thin Fresnel lenses being aligned using a cylinder.

1. Neutron Fresnel Lenses a. Typical Embodiments of Fresnel Compound Refractive Lenses Typical embodiments of the present invention are shown in FIG. 2 and FIG. 3. Both methods require machine shop tolerances of alignment. FIG. 2 shows an exploded view of one embodiment in which Fresnel lenses 12 are supported by an annular support structure 23 and aligned by means of alignment rods 25 (e.g. dowel pins) with a support base 27. Unit Fresnel lenses 12 are aligned relative to the support structure alignment means, which in the case of the rings could be the outside diameter of the ring; i.e. this means that the unit lens should be concentric with the ring structure.

As is shown in a second embodiment of FIG. 3, the unit Fresnel lenses 12 are aligned by using unit lens support structure 23 by stacking them inside a support alignment cylinder 46. Accuracy is achieved by machining the unit lens support structure's 20 diameter to be slightly less than the diameter of the alignment cylinder 46. End caps 42 and 43 are used to hold the unit Fresnel lenses 12 in the alignment cylinder.

Figure 4:
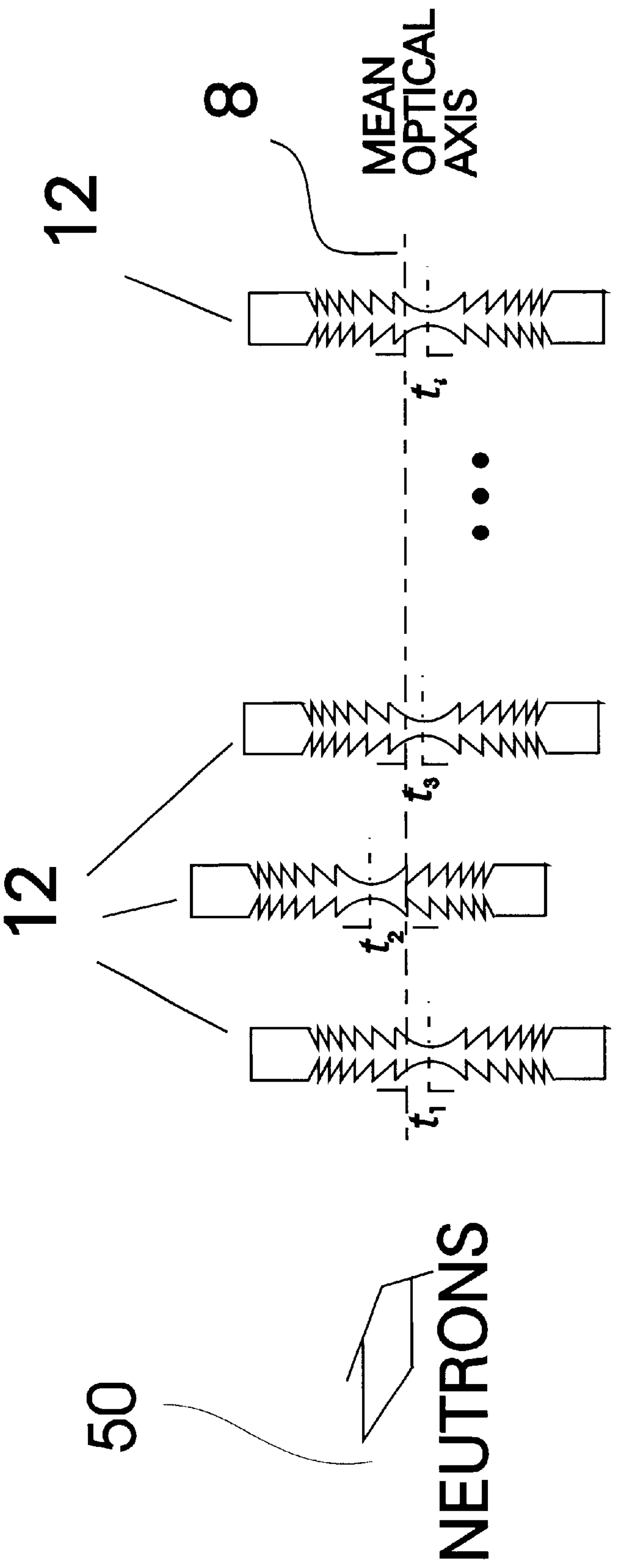
FIG. 4 shows a linear series of Fresnel unit lenses displaced off the mean optical axis.

These common machining techniques of alignment rods 25 and cylinder 46 in FIGS. 2 and 3, respectively, can be used because there can be a displacement (or error) off the mean optical axis 8 as illustrated in FIGS. 4. In the present invention the individual displacements are viewed as unavoidable errors that are intrinsic with any repetitious mechanical system. In FIGS. 2 and 3 the displacement of the unit lenses is minimized by the alignment rods 40. As one skilled in the art will readily recognize, other alignment means can also be used. Such an arrangement allows the individual lenses to be manufactured individually and, thus, allows complex lens surfaces, such as Fresnel surfaces, to be fabricated.

Figure 5:
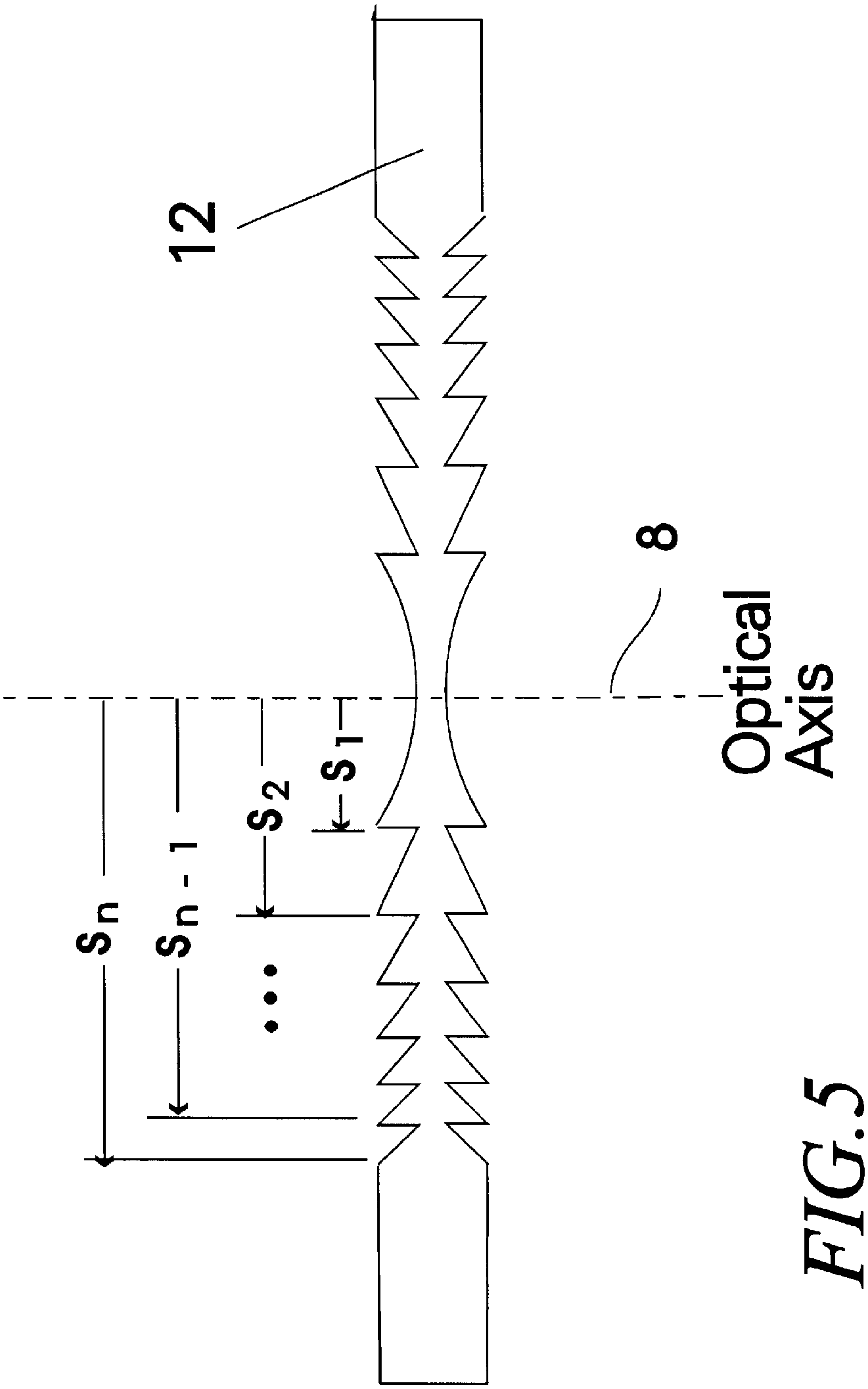
FIG. 5 shows a single Fresnel unit lens with various Fresnel zones with the width of the smallest zone being $s_{n-1}-s_n$.

The individual Fresnel lens units of FIGS. 2 and 3 can be plano-concave, bi-concave, plano-convex or bi-convex (the difference is that these lenses will operate in an opposite fashion to those of optical (visible) lenses in that the concave lenses will focus and the convex lenses will diverge the x-rays). As shown in FIG. 5, the general shape of the lenses is the standard saw-tooth pattern of an optical Fresnel lens. However, the surface figure typically follows a pattern that can be cylindrical, spherical, or parabolic, although other shapes may also be useful.

b. Fresnel Lens Shape

As shown in FIGS. 2 and 3, neutrons pass through multiple Fresnel lenses 12 that are accurately aligned, so that the neutrons are collected and focused. A necessary but not sufficient condition is that the unit Fresnel lenses 12 are accurately aligned so that the root mean square deviation of the lenses, $\sigma_r$, off the mean optical axis of the unit lenses is less than ¼ of the width of the smallest Fresnel zone of the individual lenses. That condition, called here the "condensing CRL," works for increasing the intensity.

If one wishes to obtain high-resolution images, a further condition imposed provides for $2\pi n$ (n=1,2,3 . . . ) phase shift of the neutron wavelength between zones across the neutron compound refractive lens. This phase shift is easily achieved by designing the heights of the steps at each zone radial limit $s_n$ such that there is a phase difference of $2\pi$ or 360° from the step height. This embodiment, called here the $2\pi$-phase shifted CRL, permits imaging and diffraction-limited focusing of the neutrons.

Both the $2\pi$-phase shifted CRL and the condenser CRL should have Fresnel unit lenses aligned within a modest parameter range. A simple analysis can be performed for determining the effect of misalignment on Fresnel unit lenses. We can find the effect that misalignment has on the phase of the various zones of the serially aligned zones. A one-dimensional analysis suffices where the thickness of each lens as a function of radius given by $$d = as^2 - \Delta\left(\sum_{i=1}^{n} H(s - s_i)\right) \tag{8}$$

where s is the radial coordinate (see FIG. 5), $a=(2Nf\delta)^{-1}$ is the parabolic constant of the surface of each lens 12 that composes a neutron CRL having a focal length f which is made with N individual lenses with n Fresnel zones each lens and formed from a material having a refractive index decrement $\delta$. $H(s-s_i)$ are unit step functions which are multiplied by $\Delta$ producing a step jump $\Delta$ at the $i^{th}$ Fresnel zone radius $s_i$. Such a Fresnel unit lens 12 with optical axis 8 is shown in FIG. 5.

When a small displacement from the axis $t_j$ is introduced for each lens i whereupon the total thickness of the CRL is derived to be $$d_{Tot}=\frac{s^2}{2f\delta}+\frac{\sigma_t^2}{2f\delta}-\frac{N\Delta}{2\sigma_t}\left(\sum_{i=1}^{m}(s-s_i+\sigma_t)\right) \tag{9}$$

where $\sigma_t$ is the variation of the probability distribution of the randomly displaced from axis Fresnel lenses. The phase through the entire lens, $e^{i\Phi}$, is found using the total thickness of the CRL from equation (11) to be $$i\phi=\left(ik\delta-\frac{\mu}{2}\right)\left(\frac{s^2+\sigma_t^2}{2f\delta}-\frac{N\Delta}{2\sigma_t}\left(\sum_{i=1}^{m}(s-s_i+\sigma_t)\right)\right) \tag{10}$$

here k is the neutron wavenumber ($2\pi/\lambda$) and $\mu$ is the linear absorption coefficient of the lens material.

The effect of misalignment of Fresnel lenses in a neutron CRL then reduces to finding the change of intensity at the image plane introduced by the randomly displaced individual Fresnel lenses composing the neutron CRL. The intensity at the image plane from a CRL as the one whose phase is described by equation (10) is found from diffraction theory of propagation of light through the solution of the appropriate Fresnel-Kirchoff mathematical interpretation of Huygens' principle of optics. From such analysis it is observed that the phase effects introduced by unit lens zone misalignment effectively reduces the contribution from each zone to the intensity. The overlapping areas of the unit lens zones produce less bright regions across the aperture of the neutron CRL. Also, there is an averaging of the attenuation from the overlapping regions of the zones from the unit lens zone misalignments in the neutron CRL. Additionally, in this embodiment the total phase change across the whole neutron compound refractive lens at the zone radii, $s_i$, at the neutron wavelength of operation should be approximately $2n\pi$ or n360°, n an integer greater than 0. This preserves the self-coherence of the Fresnel compound refractive lens for point to point imaging such that any ray emitted by an object point collected at any place of the lens aperture arrives at the image point with the same phase. Thus, using equation (10) the unit lens zone total height of the steps across the neutron Fresnel compound refractive lens at the $1^{th}$ zone are related by $\Delta=(s_l^2-2\lambda nf)/2N\ \delta f\ 1$ in the embodiment where double sided parabolic unit lens zones are used and misalignment effects are neglected. This requirement is particularly stringent if the neutron compound refractive lens is to be used in applications where high resolution is needed such as for imaging experiments. However, in this embodiment if the neutron compound refractive lens is to be used in an application where there is an emphasis on neutron concentration at an intense focal spot the previous requirement can be relaxed. To minimize the image loss of intensity due to misalignment of unit lens zones having a distribution of width $2\sigma_t$ in a neutron CRL each zone should be greater than $2\sigma_t$ to have any contribution to the intensity of the image. Thus, for the nth zone to contribute significantly to the intensity gain it should obey $$\sigma_t \leqq [s_n-s_{n-1}]/4 \tag{11}$$

For a Gaussian distribution of the unit lens Fresnel zone misalignment displacements with $\sigma_g$ the standard deviation of the distribution, the requirement is even more demanding having to obey $$\sigma_s \leqq [s_n-s_{n-1}]/8 \tag{12}$$

In this embodiment to cover all practical application the variations of unit lens alignment are limited so that the zone widths ($s_n-s_{n-1}$) are greater than $4\sigma_t$.

For unit Fresnel lenses aligned using standard machine-shop tolerances ($\sigma_s \geqq 6\ \mu$m), the zone widths are limited to be greater than 24 $\mu$m but, more accurate alignments can be achieved using more precise optical techniques. This may permit the placement of the lenses with accuracy of less than 1 $\mu$m. Zone widths can then be less than 4 $\mu$m. In the present invention the fabrication of the unit lenses can be accomplished by current techniques that are used to fabricate Fresnel lenses for the optical range of wavelengths. These include optical, compression molding and injection molding techniques. Selection of materials for the unit lenses is primarily determined by maximizing the coherent over that of the diffuse neutron scattering or figure of merit, $\delta/\mu$, of the material of each unit lens.

A variation of the $2\pi$-phase shifted CRL, is an embodiment wherein each unit Fresnel lens is made such that there is a $2n\pi$ or n360°, n=1, 2, 3, . . . , phase shift at each zone radius $s_i$ depicted in FIG. 5. In this embodiment there is no phase randomization effect at the neutron wavelength of operation and of a very small bandwidth about this wavelength and the alignment requirements are relaxed. This embodiment also preserves the self-coherence of the Fresnel compound refractive lens for point to point imaging such that any ray emitted by an object point collected at any place of the lens aperture arrives at the same image point with the same phase. In this embodiment zones may be aligned to a fraction of their widths larger than 0.25 or $$\sigma_t \leqq [s_n-s_{n-1}]/4 \tag{13}$$

c. Required Tolerance for the Fresnel Lens Surface Features

Since lens' surfaces are not ideal and may contain imperfections, what is the effect on the image of thickness changes from the ideal parabolic surface? A change is the surface of the lens will result in a phase change for the neutrons traveling through the lens. Let $\Delta\tau$ be the thickness error in the lens surface. The change in phase from such an error is given by:

$$\Delta\phi=k\delta\Delta\tau \tag{14}$$

A phase change of $\Delta\phi \geqq \pi/2$ will result in destructive interference; thus the allowable thickness error is given by:

$$\Delta\tau \leq \frac{\lambda}{4\delta} \tag{15}$$

If this same error exists in every lens at exactly the same position (not impossible, since these lenses may use reproduction techniques that yield almost identical lenses), then the phase error will add linearly. Then the maximum allowable error for each single lens is given by:

$$\Delta\tau_e \leq \frac{\lambda}{4\delta N} \tag{16}$$

As an example, consider a neutron lens made of Be for 1.8 Å wavelength neutrons, $\delta=4.95\times10^{-6}$ and N=100 (a hundred individual lenses), then $\Delta\tau_e \leqq 0.1\ \mu$m or roughly a quarter wavelength ($\lambda/6$) of visible light. This is an achievable tolerance for ordinary optical (visible light) lenses. Thus, stated briefly, standard surface tolerances of optical lenses can be used for x-ray lenses. This is counter intuitive, given that we are utilizing lenses of optical quality to focus x-rays whose wavelengths are roughly a thousand times smaller.

If the surface errors are at random, then an even larger tolerance can be allowed for the surface imperfections. This can be seen by assuming that error in $\Delta\tau$ is given by the probability function. The surface errors (assumed to be random), $\Delta\tau$, are given by a probability distribution with a standard deviation of $\sigma_s$. Tolerance in surface imperfections is then defined by the condition that the standard deviation for the phase is $\Delta\phi \geqq \pi/2$. The variance for the phase distribution is then given by: $2N(k\delta)^2\sigma_s^2/\sqrt{2}$.

To minimize phase distortion, the variance should be $\leqq(\pi/2)^2$. Using this condition and solving for $\sigma_s$ one obtains:

$$\sigma_s \leq \frac{\lambda}{4\delta\sqrt{N}} \tag{17}$$

Thus when the error position is at random, the RMS value of $\Delta\tau$ goes as the square root of the number of unit lenses. Comparing eqn. (17) to eqn. (16), one sees that when the error is random, the tolerance is increased by a factor of $\sqrt{N}$.

Given our example above of the Be lens (N=100) at 1.8 Å wavelength neutrons, if the surface error is entirely random, then from eqn. (17) one can tolerate an error of $\Delta\tau_e \geqq 1$ μm , a factor of 10 higher than that required for the case where the error is identical for each lens. Thus, the tolerance of error in the lens surface is quite large and greater than that of even optical lenses. Thus, conventional machining and optical lens making techniques can be used for making individual lenses that can be mechanically stacked to form a compound refractive x-ray lens. Once again, this is counter intuitive given that we are utilizing lenses of optical or even infrared quality to focus neutrons whose wavelengths are anywhere from 1000 to 10,000 times smaller.

d. Step Height

To maximize the gain of the Fresnel lens array, we have calculated the gain of the array as a function of step location and height. Since the absorption increases with step height, one might assume that the maximum height should be limited such that the maximum absorption was 1/e over that of the step trough (this is similar to the criteria that Piestrup et al. (U.S. Pat. No. 6,269,145) used for determine the step height of x-ray Fresnel lenses). However, selecting the maximum step height to be even smaller results in higher gain (The base thickness is not included in this absorption calculation and should be added as a constant term as discussed below.). Limiting the absorption of the x-rays at the step's maximum height to be less than $\approx 1/e^{0.6}$ does not appreciably increase the gain further. Reducing the maximum absorption at each step results in more Fresnel periods. Factors of 1.6 increase were calculated for the $1/e^{0.6}$ case over that of the 1/e embodiment. Thus, the gain doesn't vary rapidly with position and height, so that the step location and height is not too critical.

In some embodiments mechanical fabrication limitations may determine the minimum thickness of the lens and, hence, the step height. For example, lathe machining reproduction techniques of the Fresnel lens surface will limit the number and size of the steps. Present technology limits diamond turning to pitch angles, $\phi_p$, of the each Fresnel step to be approximately 20°, thus limiting the size and number of Fresnel steps.

e. Lens Design

It will now be demonstrated that one can design neutron lenses using simple analytic expressions. These lenses can have identical or different surfaces on each side of lens (e.g. the lenses can be bi-Fresnel or they can be plano-Fresnel.).

In order to obtain a rough design of the CRL, one needs two equations: the eqn. (1) and eqn. (19) (below) for the transmission through the CRL. Given the lens' material constants, $\mu$ and $\delta$, and the desired focal length of the CRL, one can then design the individual lenses. Using eqn. (1):

$$N = \frac{R}{2f\delta}. \tag{18}$$

In the design of all the lenses listed above, this equation can be used. The factor "R/2" in the equation changes depending upon the lens' shape chosen. For a Fresnel spherical or cylindrical lens, R is the radius of the cylinder, $R_h$, or sphere, $R_s$. For a parabolic lens, $R_p$ is radius of curvature at the vertex of the parabolic lens (or 2 $R_p$ is the Latus Rectum of the parabola) in the equation for the surface of the lens, $$2d = \frac{r^2}{R_p}.$$

For the case of plano-convex or plano-concave Fresnel lenses, the factor "R/2" become "R".

In order to do a simple calculation of the lens parameters, one needs to limit the amount of x-ray absorption that occurs in the CRL. The x-ray absorption limits the number of lens that one can use. The fraction of transmission through the CRL is given approximately by:

$$T = \exp\{-\mu_{lens}d_{ave} - \mu_{base}\Delta\}N \tag{19}$$

where: $\mu_{lens}$ and $\mu_{base}$ are the linear absorption constants of the lens and the base, respectively; $\Delta$ is the thickness of the base support and $d_{ave}$ is the average thickness of the each lens found in general from:

$$d_{ave} = \frac{\int_0^{R_e} s(r)\,dr}{R_e} \tag{20}$$

where s(r) is the individual lens thickness as a function of the radial variable. To minimize absorption we require that the transmission $T > e^{-2}$ (roughly 13.5% transmission) or:

$$N < \frac{2}{\mu_{lens}d_{ave} + \mu_{base}\Delta} \tag{21}$$

Using eqn. (44) the design of a lens is simple, given the desired focal length, one determines the radius R based on the following:

$$R = 2Nf\delta \tag{22}$$

Eqns. (21) and (22) gives the maximum values for N and R, respectively. One can use these equations to calculate the lens shape based on the desired focal length and know material parameters of the individual lenses.

In most cases the average thickness of the lens is much smaller than that of the base, $\Delta$. Thus, to first order eqn. (21) becomes:

$$N < \frac{1}{\mu_{base}\Delta} \tag{23}$$

For a more accurate estimate, the average thickness, $d_{ave}$, of the unit Fresnel lens can be obtained from the geometries of the various Fresnel shapes by obtaining the average absorption across the individual lenses. The gain for x-ray Fresnel is given in Piestrup et al. and can easily used for neutron Fresnel CRLs. To determine the effectiveness of the lens in gathering neutrons and focusing them, one can calculate the gain. A gain greater than one (G>1) indicates that the lens is effective as a collector of x-rays. Gain, it should be noted again, is a function of both the lens parameters and the source parameters (source size and distance from the lens). Thus, in comparing gains for different lenses, one needs to use identical sources (same source size and distance).

2. Neutron Conditioning and Monochromatizing

Figure 6:
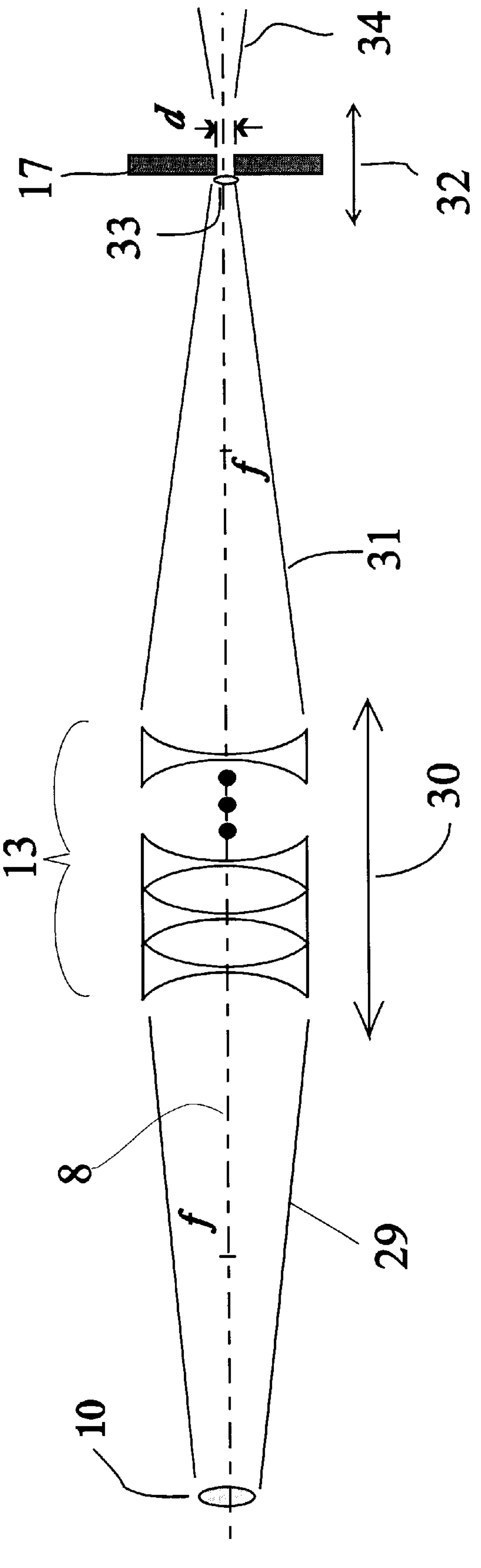
FIG. 6 shows the main elements of a neutron monochromator and beam-conditioning device.

FIG. 6 shows a sketch of the neutron monochromator and beam-conditioning instrument. A neutron CRL 13 collecting extreme rays 29 from the neutron source 10 images the neutron source 10 onto the image plane. Neutron focusing rays 31 produce an image of the source 33 where a variable size aperture 17 set up to the appropriate size or a diaphragm is placed. Because of the aperture size the apparatus selects a desired bandwidth of the monochromatized emerging neutron 34 beam. The motion of the aperture along the propagation axis 32 allows for a selection of the central neutron wavelength as different neutron wavelengths make an image of the neutron source 10 at different positions along the optical axis 8. If by the use of the motion along the optical axis 30 of the neutron CRL 13 the distance between the neutron lens and the neutron source is made that of its focal length f the lens collimates the neutron beam emerging from it. The latter refers to the emerging neutrons from the neutron lens system 31 describing parallel trajectories. In this case an instrument that simultaneously collimates and monochromatizes is implemented by placing an aperture of the appropriate size or diaphragm a distance back from the neutron lens so as to select a desired bandwidth and collimation for the beam of monochromatized emerging neutrons 34. In general, a convenient setup is to set the aperture 17 the size of the neutron compound refractive lens 13 aperture size. However, other slight refinements are possible setting the neutron CRL 13 at distances from the source other than the focal length, and the variable aperture 17 to different sizes and distances to achieve the desired degree of monochromatization and collimation of the beam of emerging neutrons 34.

In the preferred embodiment the operation of a monochromator combines a neutron refractive lens system placed at a distance from a neutron source together with an aperture placed at the image plane of the lens. The combination relies on the ability of the lens to image the source at different distances from the lens for the different neutron wavelengths emitted from the source. This change of image distance arises from a strong wavelength squared dependence of the decrement of refractive index of the lens material on neutron wavelength. This strong wavelength dependence results in the lens having different focal lengths for different neutron wavelengths, the neutron lens focal length being inversely proportional to the decrement of the index of refraction. Thus, the lens images the different neutron wavelengths of the source at different distances from the lens at which point a narrow bandwidth around the fundamental wavelength is selected by means of an aperture with the appropriate size.

In this embodiment the neutron refractive lens system images the neutron-emitting source onto the image plane by focusing rays to the image of the source where an aperture of the appropriate size or a diaphragm is placed. Because of the aperture size the apparatus selects a desired bandwidth of the emerging monochromatic neutron beam. The motion of the aperture along the propagation axis allows for a selection of the central neutron wavelength as different neutron wavelengths make an image of the neutron source at different positions along the optical axis. If by the use of the motion along the optical axis of the neutron lens system the distance between the neutron lens and the small neutron source is made that of its focal length f the lens collimates the neutron beam emerging from it. The latter refers to the emerging neutrons from the neutron lens system describing parallel trajectories to the propagation axis. In this case an instrument that simultaneously collimates and monochromatizes is implemented by placing an aperture of the appropriate size or diaphragm a distance back from the neutron lens so as to select a desired bandwidth for the monochromatized emerging neutrons.

The focal length of the compound refractive lens depends upon the refractive index, $\delta$, which is in turn is proportional to the inverse squared of the neutron wavelength. Thus the compound refractive lens is highly chromatic, with the image distance varying inversely proportional to the neutron wavelength squared. By designing the lens to focus neutrons of particular wavelengths at an aperture, only a small range of energies will be passed through the aperture. At shorter neutron wavelengths, the focal length will be longer than that of the desired neutron wavelength and at longer wavelengths, the focal length will be shorter than the desired neutron wavelength. The compound refractive lens-aperture combination will dramatically dampen the neutron flux of shorter and longer neutron wavelengths outside a bandwidth around the selected wavelength.

The Kirchhoff integral, which is a mathematical representation of Huygen's principle, is utilized to analyze the performance of the compound refractive lens-aperture monochromator and to optimize the design and performance of the tunable neutron filter. The size and location of an aperture placed downstream from the lens will be determined from the model to produce a transmitted beam with a specified wavelength, and bandwidth. The bandwidth of the neutron monochromator depends upon the aperture width $\Delta$ and, for an optimized bandwidth, is set to be $\Delta=\sigma \cdot r_i/r_o$. The ability of the compound refractive lens-aperture combination to achieve a small bandwidth of emerging neutrons is modeled assuming an isotropic and polychromatic neutron source placed at a distance from the compound refractive lens. The bandwidth of the throughput of the monochromator that uses compound refractive lenses made of different materials is calculated with the above-mentioned procedure. The normalized intensity spectra captured by an aperture of the appropriate size are obtained at the image plane corresponding to a desired wavelength and compound refractive lens focal length. Neutron bandwidths, $\Delta\lambda/\lambda$, below 10% are readily obtained depending on neutron source size, compound refractive lens focal length, distance to the source, and aperture size.

Figure 7:
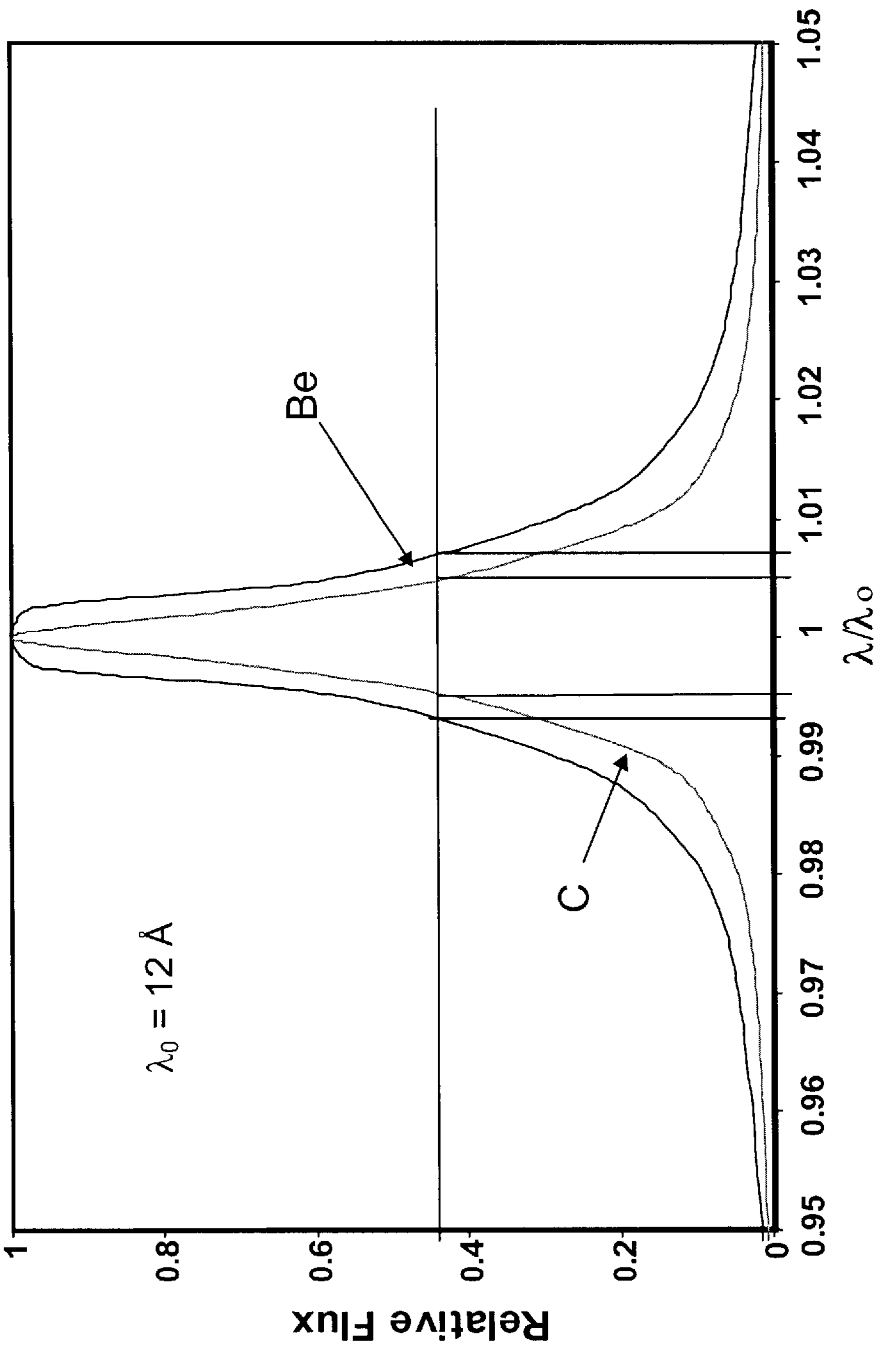
FIG. 7 shows neutron beam band-pass on the aperture plane.
Figure 8:
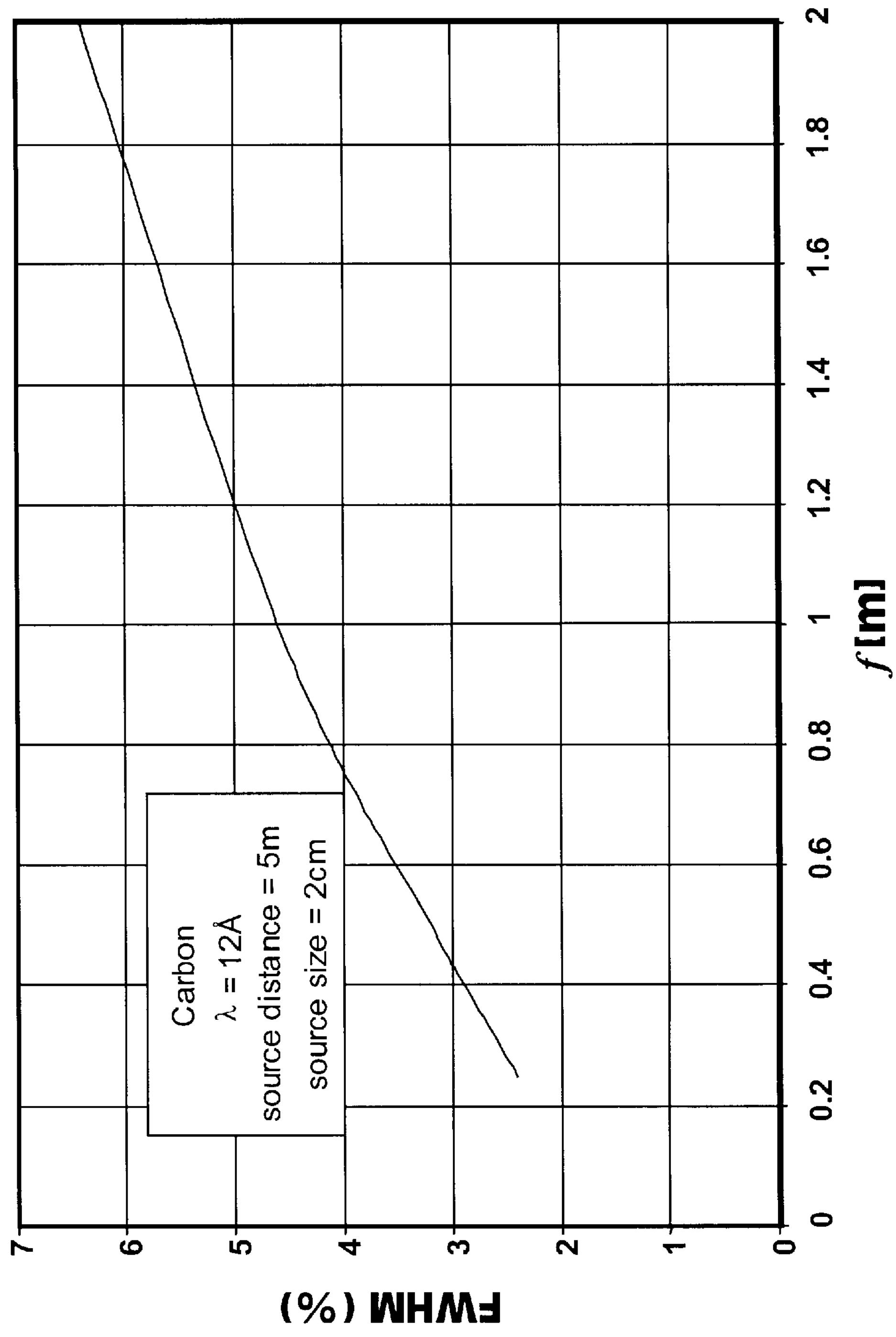
FIG. 8 shows bandwidth full width half maximum (FWHM) as a function of neutron refractive lens system focal length.
Figure 9:
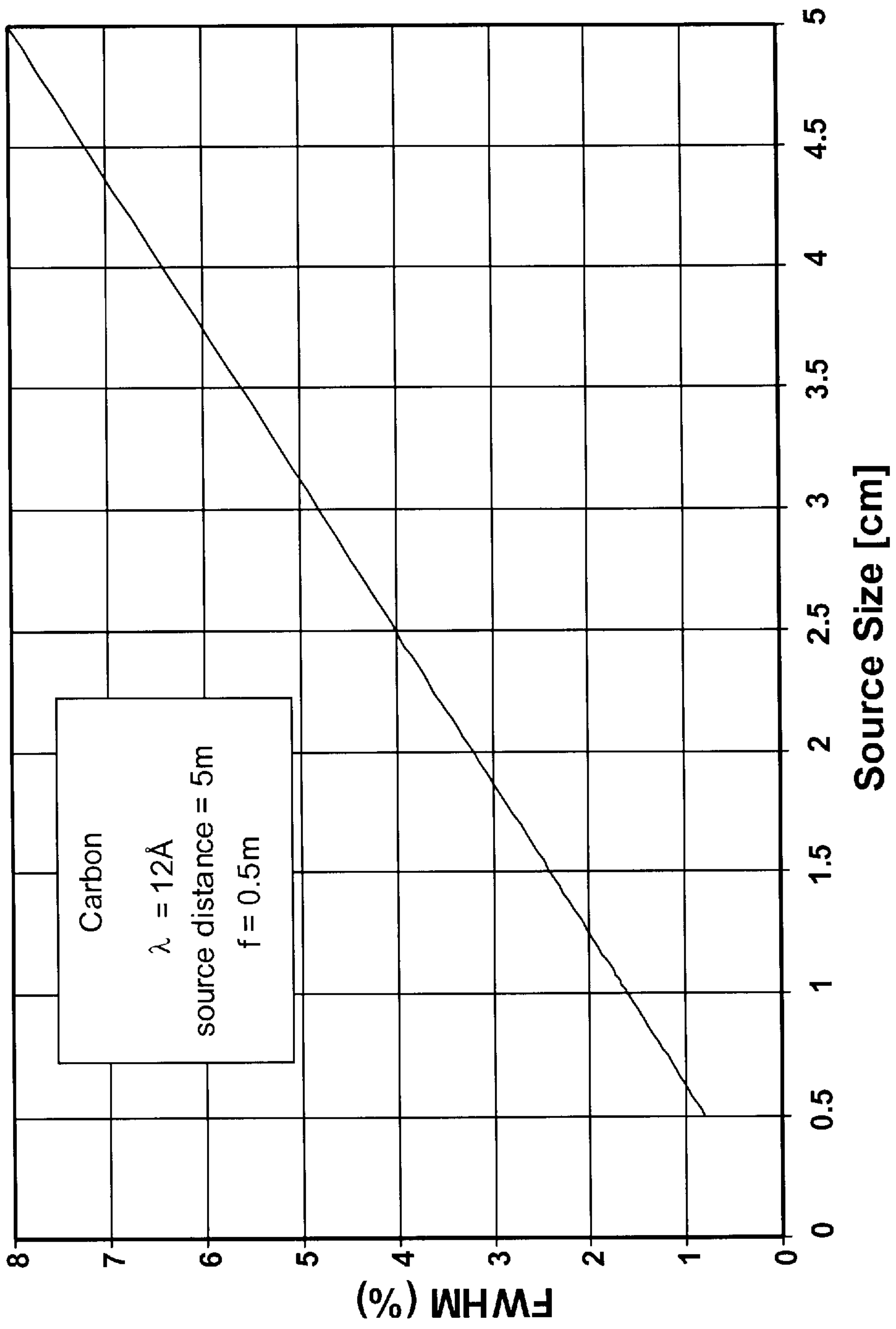
FIG. 9 shows neutron bandwidth (FWHM) on the image plane as a function of neutron source size.
Figure 10:
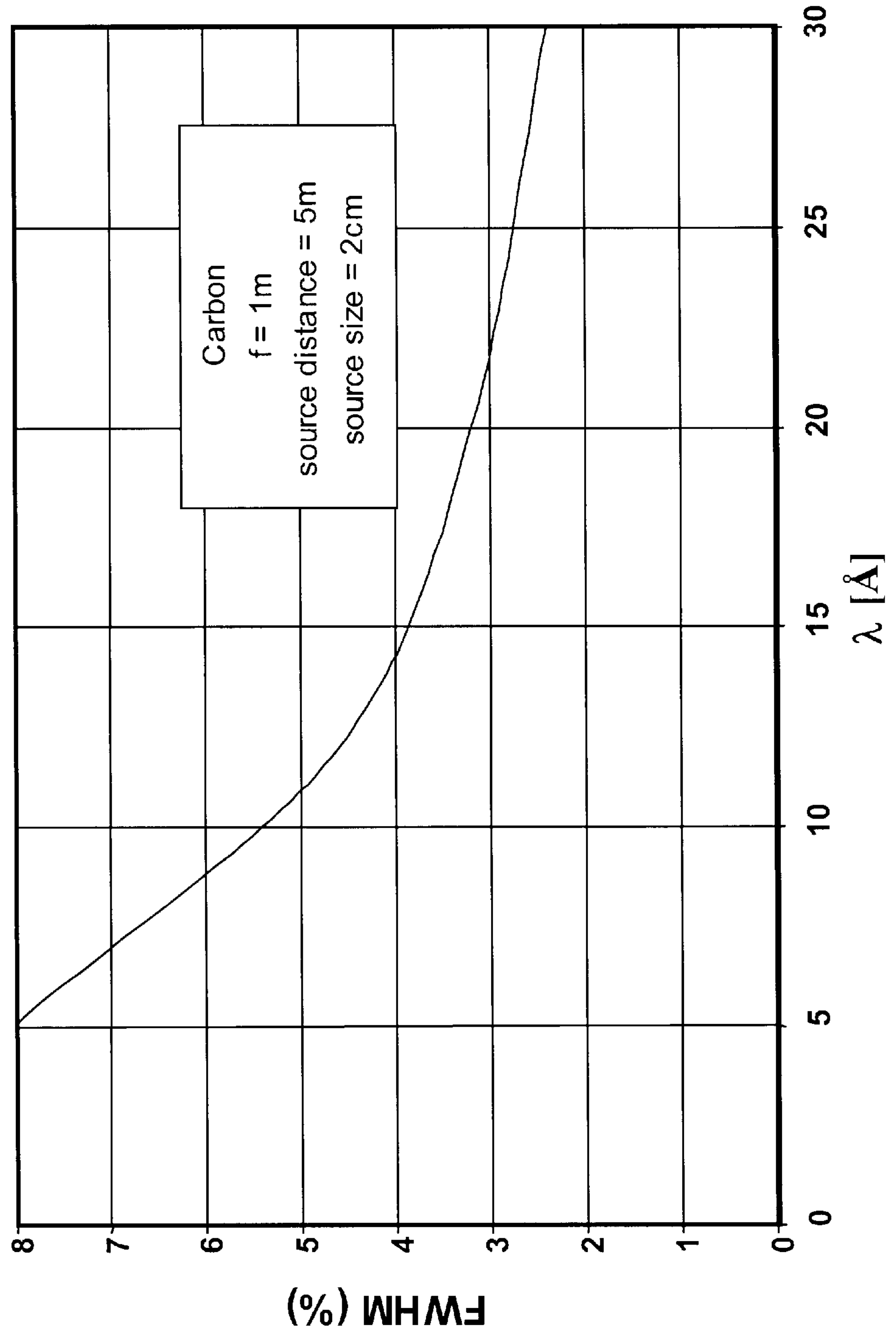
FIG. 10 shows neutron bandwidth (FWHM) on the image plane as a function of neutron wavelength.

The analysis to find bandwidth characteristics at an aperture placed downstream from the lens is computed by using the appropriate physical optics propagation of light arguments, through diffraction theory of images and intensity distributions on arbitrary planes by solving the appropriate diffraction Fresnel-Kirchoff integrals. The results of the analysis are presented in FIGS. 7 through 10. FIG. 7 shows the normalized intensity spectrums at the image plane captured by an aperture the size of the image of a 5 mm size isotropic and polychromatic neutron source placed at 5 m from neutron lens systems. The unit lenses of the neutron compound refractive systems are made of Be and of C and both lens systems have a focal length equal to 0.5 m at 12 Å neutron wavelength. FIG. 8 shows the bandwidth of neutrons FWHM obtained at the image plane by an aperture the size of the image of a 2 cm diameter isotropic and polychromatic neutron source vs. the focal length of C neutron lens systems placed a distance equal to 5 m from the source. FIG. 9 shows the bandwidth of neutrons FWHM captured at the image plane by an aperture the size of a neutron source image vs. the size of the neutron isotropic polychromatic source that is imaged by a carbon lens placed at 5 m from the source which has a focal length equal to 0.5 m at 12 Å neutron wavelength. FIG. 10 shows the bandwidth of neutrons FWHM captured by a an aperture the size of the image of an isotropic polychromatic neutron source 2 cm diameter that is being imaged by a carbon lens system with focal length equal to 1 m vs. the central neutron wavelength around which the bandwidth is selected.

3. Achromatic Compound Refractive Lens Pair

Since most neutron beams have finite bandwidths, it is important to make the compound refractive lenses as achromatic as possible. Compound refractive lenses are chromatic since their focal length varies with wavelength. For conventional optics, a large variety of achromatic systems built from two or more chromatic lenses have been developed and these are directly applicable to compound refractive lens systems. These methods could be extended to neutron refractive optics. Two properly arranged neutron compound refractive lenses are capable of having a nearly constant combined focal length over large variations of wavelength. This is achieved by placing the two neutron lenses having focal lengths $f_1$ and $f_2$, at an appropriate distance, d, apart. The optimum distance, d, to minimize chromatic aberration from the two neutron compound refractive lenses is given by $$d = \frac{K_1 + K_2}{K_1 K_2(\lambda_a^2 + \lambda_b^2)} \tag{25}$$

where $$K_i = \frac{\rho_i b_i' N_i}{R_i \pi}, \rho_i$$

is the number density of the $i^{th}$ lens material or number of nuclei per unit volume in the $i^{th}$ lens material and $b_i'$ is the scattering length of the $i^{th}$ lens material, and $\lambda_a$ and $\lambda_b$ are the extreme neutron beam wavelengths. If the two lenses are identical then the distance, d, is given by $$d = \frac{2}{K(\lambda_a^2 + \lambda_b^2)} \tag{26}$$

or $$d = f_0 \tag{27}$$

where $f_0$ is the focal length of any of the two lenses at the central wavelength $\lambda_0$ given by $$\lambda_0^2 = \frac{\lambda_a^2 + \lambda_b^2}{2} \tag{28}$$

In this embodiment for a conventional compound refractive lens there is ±10% variation in f over 10% bandwidth and ±20% variation over 20% bandwidth. For an achromatic compound refractive lens there is ±0.9% variation over 10% bandwidth and ±2.5% variation over 20% bandwidth. Thus, in the present invention two identical compound refractive lenses, separated by an appropriate distance, may be used to perform chromatic correction.

4. Neutron Microscope a. Amplitude-Contrast Microscope

The simplest embodiment of an amplitude-contrast neutron microscope includes the following three components: (1) a neutron source that can be either polychromatic or quasi-monochromatic; (2) a neutron optic configured as a compound refractive lens that images the specimen onto a neutron detector; and (3) a neutron detector for visible image production and storage.

Figure 11:
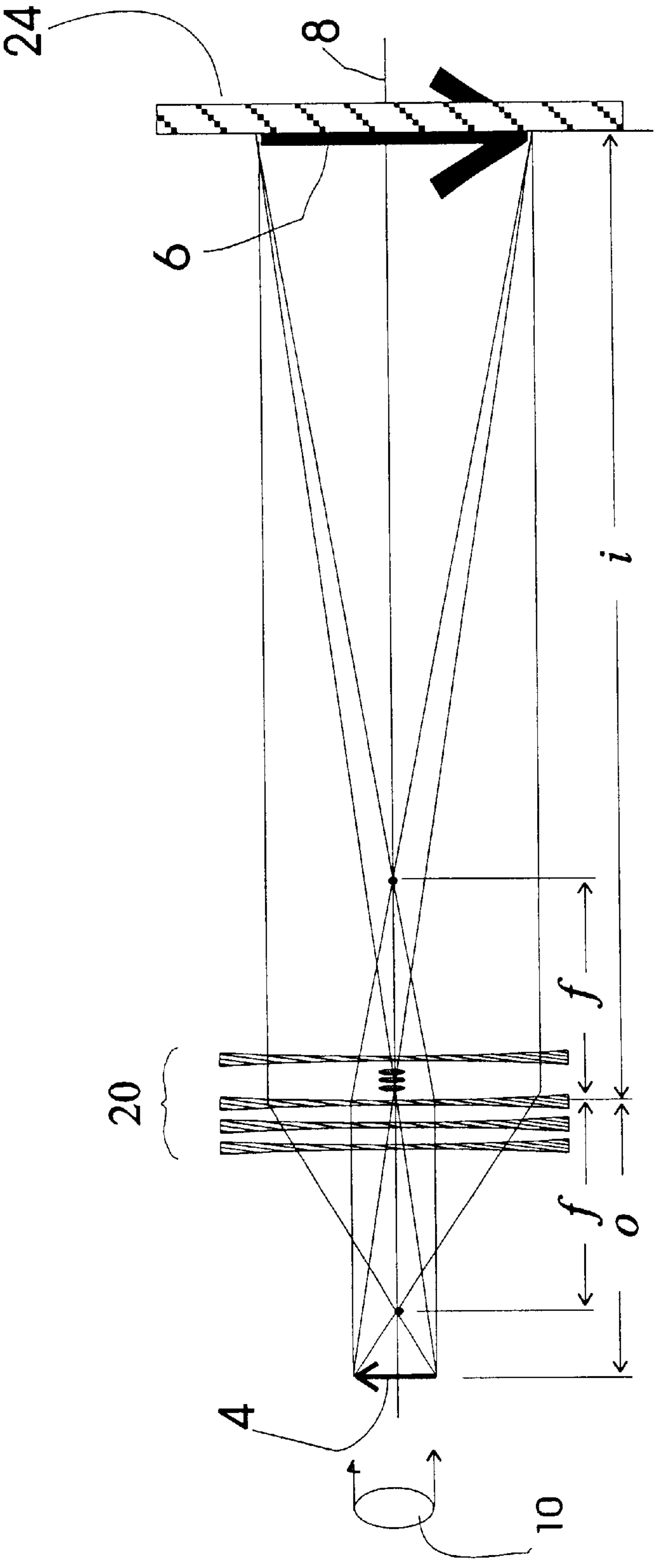
FIG. 11 shows a schematic diagram of a neutron microscope using a single compound refractive lens that produces images through an amplitude contrast technique.

This simple embodiment is given in FIG. 11. In this embodiment, it is assumed that a quasi-monochromatic neutron source 10 with a small bandwidth (e.g. less than 2%) and possessing cold or thermal neutrons is available to illuminate the specimen 4 (show here as an arrow). Such quasi-monochromatic sources are available at several of the international laboratories where conventional neutron monochromators exist to monochromatize the neutrons. A stack of unit lenses forming a neutron compound refractive lens 20 designed to have a focal length f is used to image the illuminated arrow specimen 4. The compound refractive lens capable of imaging neutrons is manufactured as discussed in the literature. The compound refractive lens 20 is positioned downstream from the arrow as shown relative to the arrow specimen 4 and the desired transverse magnification M. The compound refractive lens 20 images the neutrons in a similar fashion that an ordinary visible optics lens would do for visible radiation. As in the optical case the image 6 of the specimen 4 is magnified and turned upside down. In this embodiment, the image is obtained by using neutron-absorbing film or large planar neutron detector 24, which exists in the literature.

To obtain magnification the lens should be positioned carefully. Given a desired transverse magnification M and the focal length f of the compound refractive lens we can position the compound refractive lens properly. The ratio of the transverse dimensions of the final image formed by the compound refractive lens to the corresponding dimension of the object is defined as the lateral or transverse magnification M. Thus the desired transverse magnification is given by $$M = -\frac{o}{i},$$

where i is the distance (image distance) from the compound refractive lens 20 to the specimen image (arrow) 6 and o is the distance (object distance) from compound refractive lens 20 to the specimen (arrow) 4. The negative value of M means that the image is inverted. Distances i and o are related to the focal length of the lens by the ordinary lens equation given by:

$$\frac{1}{f} = \frac{1}{i} + \frac{1}{o}$$

As shown in FIG. 11, i and o are larger than f in order to achieve magnification. Given a desired magnification one can thus use the lens equation to calculate the i and o and, thus position the compound refractive lenses correctly.

In other embodiments shown in FIG. 12*a* and 12*b*, a neutron condensing optic 22 is used collect and focus neutrons on to a specimen to be imaged. The condenser optic 22 collects neutrons from the neutron source 10 and then focuses them on to the specimen 14 to be imaged. This increases the amount of neutrons for imaging reducing imaging time for exposure of the film or other detector 24. For quasi-monochromatic neutrons the condenser can be a configured either as a reflective optic such as a curved focusing neutron mirror, preferably with a multilayer coating to increase its reflective capacity or a compound refractive lens. In the schematic drawings of FIGS. 12*a* and 12*b* the condenser optic 22 is a compound refractive lens.

In the embodiments of FIG. 12*a* and 12*b*, the CRLs 20 ($1^{st}$ CRL of achromat) and 21 ($2^{nd}$ CRL of achromat) that images the specimen onto the detector are made achromatic such that they are the least affected by the neutron source bandwidth. These embodiments produce images of the specimen with adequate resolution with no appreciable chromatic aberration from the neutron-beam bandwidth. The ability to make an achromatic compound refractive neutron lens is very important for most neutron sources, which are, at best, quasi-monochromatic (e.g. 5 to 10% bandwidths). To achieve higher resolution the compound refractive lenses should be made to be achromatic. The imaging objective lenses (achromatic pair 20 and 21) are positioned relatively to the specimen 14 and the detector 24. The two lenses separated by $d=f_0$ as taught above in equations (25) and (27), where $f_0$ is the focal length of any of the two lens at the central wavelength $\lambda_0$ given by $$\lambda_0^2 = \frac{\lambda_a^2 + \lambda_b^2}{2}.$$

The imaging objective CRL achromatic pair 20 and 21 performs just as the single imaging-objective lens 20 did alone in FIG. 11, which is to image the specimen 14 with high resolution. The lens pair forms a single achromatic CRL. Again the lens formula and the desired transverse magnification $$M = -\frac{o}{i}$$

is used to determine the position of the imaging achromatic objective compound refractive lens pair 20 and 21. As in the embodiment of FIG. 11, i and o are larger than f in order to achieve magnification.

In the embodiment of FIG. 12*b*, where a polychromatic neutron source is used, the condenser optic 22 is configured as a compound refractive lens in combination with a suitable diaphragm or iris 18, which is placed within the depth of focus of the compound refractive lens. As we have seen above and in FIG. 6, this compound refractive lens condenser optic 22 and pinhole diaphragm 18 combination quasi-monochromatizes the neutron beam 8 impinging on the specimen and at the same time collects and maximizes the neutron flux to the specimen 14. Bandwidths of less than 10% can be obtained. The resulting neutrons 8 can then be used to image the specimen.

The achromatic imaging achromatic objective CRL pair 20 and 21 made of a compound refractive lenses can now image the specimen 14, as was the case in FIG. 12*a*. The diffracted neutron beam 8 from the specimen 14 passes through a compound refractive lens imaging achromatic objective compound refractive lens pair 20 and 21 that forms a high resolution image of the specimen on the detector 24. Positioning the imaging objective correctly follows the arguments given in the discussion of embodiments of FIGS. 11 and 12*a*.

The efficiency of the condenser illumination can be optimized if only one optical element is used such as when critical illumination is utilized, as opposed to the so called "Kohler illumination," which uses more than one optical element. So called "critical illumination" directly images the neutron source on to the specimen using only one optical element.

b. Phase-Contrast Neutron Microscope

The amplitude-contrast neutron microscope can be converted into a microscope that images objects using phase contrast between neutron waves. The conversion from an amplitude-contrast to a phase-contrast instrument is achieved by using an annular condenser optic or by using an annular diaphragm near the condenser optic (e.g. FIG. 13). The imaging optic configured as a neutron compound refractive lens images the sample with high resolution on to a detector. A phase plate is placed in the rear focal plane of the compound refractive lens in a conjugate plane or in the transform plane of the annular condenser or diaphragm illuminating the specimen. The phase plate applies a 90° or 270° phase shift to the zero-order neutron rays coming from the specimen with respect to the rest of the neutron rays deflected by the sample. The thickness and material of the phase plate determine the phase shift introduced by the phase ring.

The high aperture neutron condenser is configured in an annular shape. A phase plate is placed in the conjugate or transform plane of the neutron objective where, if there were no diffraction from the specimen, the neutron rays would be focused by the imaging compound refractive lens to form an image of the condenser optic or annular diaphragm on the plate. On the plate there is a ring layer or a channel that matches the image of the condenser optic or annular diaphragm that introduces the 90° or 270° phase shift to the zero order neutron rays coming from the specimen.

Such a phase-contrast embodiment is shown schematically in the drawing of FIG. 13. A polychromatic or quasi-monochromatic source is denoted by 10. A known or conventional source of neutrons can be employed, such as nuclear reactors or spallation sources. An annular diaphragm 28 is placed in the front focal plane of the condenser optic represented in the schematic drawing of FIG. 13 by the compound refractive lens condenser optic 22. The condenser optic 22 focuses the neutrons 8 emitted by the source transmitted through the annular diaphragm 28 directing the neutrons on to the specimen 14. For quasi-monochromatic neutrons the condenser can be a configured either as a reflective optic such as an annular curved focusing neutron mirror, preferably with a multilayer coating to increase its reflective capacity or a compound refractive lens. In the schematic drawing of FIG. 13 the condenser optic 22 is configured as a compound refractive lens. When a polychromatic neutron source is used the condenser optic 22 is configured as a compound refractive lens in combination with a suitable diaphragm or iris 18 placed within the depth of focus of the compound refractive lens. The compound refractive lens 22 and pinhole diaphragm 18 combination monochromatizes the neutron beam impinging on the specimen and maximizes the neutron flux to the specimen. The diffracted neutron beam from the specimen 14 passes through a high resolution compound refractive lens imaging objective 20 that forms an image of the specimen on the detector 24. After the high resolution compound refractive lens imaging objective 20 a phase plate 26 is placed on the conjugate plane of the diaphragm 28 where, if there were no diffracted neutron rays from the specimen 14, an image of the annular diaphragm 28 would form. The phase plate 26 is made such that it introduces a 90° or 270° phase shift to the zero order neutron rays of the shape of the image of the annular diaphragm 28 coming from the specimen. This increases the contrast of the image of the specimen on the detector 24. The compound refractive lens imaging objective 20 is made achromatic such that it accepts and is not sensibly affected by the neutron beam bandwidth from the quasi-monochromatic source or from the monochromatized neutron beam delivered by the compound refractive lens condenser optic 22 and pinhole diaphragm 18 combination.

Another embodiment of the invention is presented in the schematic diagram of FIG. 14. A polychromatic or quasi-monochromatic source is denoted by 10. A known or conventional source of neutrons can be employed, such as nuclear reactors or spallation sources. A condenser optic 22 focuses the neutrons 8 emitted by the source directing the neutrons on to the specimen 14. For a quasi-monochromatic neutron source, the condenser can be a configured either as a reflective optic such as a curved focusing neutron mirror, preferably with a multilayer coating to increase its reflective capacity or a refractive compound refractive lens. In the schematic drawing of FIG. 14 the condenser optic 22 is configured as a compound refractive lens. When a polychromatic neutron source is used the condenser optic 22 is configured as a compound refractive lens in combination with a suitable pinhole diaphragm 18 placed within the depth of focus of the compound refractive lens. The compound refractive lens condenser optic 22 and pinhole diaphragm 18 combination monochromatizes the neutron beam impinging on the specimen and maximizes the neutron flux to the specimen. The diffracted neutron beam from the specimen 14 passes through a high resolution compound refractive lens imaging objective 20 that forms an image of the specimen on the detector 24. After the high resolution compound refractive lens imaging objective 20 a phase shifting plate 19 is placed in the Fourier plane of the compound refractive lens imaging objective 20. The zero order neutron radiation coming from the specimen 14 passes through the phase plate 19 with a disk in the middle, which introduces a 90° or 270° phase shift to the zero order neutron radiation coming from the specimen. This increases the contrast of the image of the specimen on the detector 24. The compound refractive lens imaging objective 20 is made achromatic such that it accepts and is not sensibly affected by the neutron beam bandwidth from the quasi-monochromatic source or from the monochromatized neutron beam delivered by the compound refractive lens 22 and diaphragm or iris 18 combination.

As one skilled in the art can readily see, various combinations of elements can be used as in FIGS. 13 and 14 to make phase-contrast neutron microscopes. For instance, compound refractive lens 20 can be replaced by two lenses forming an achromatic pair (as in the case properly spaced RCLs 20 and 21 of FIGS. 12*a* and 12*b*.). Condenser CRL 22 in FIGS. 13 and 14 can be replaced by reflective cylindrical optics. Various detectors can be used for imaging with neutrons.

What is claimed is:

1. A neutron compound refractive lens for neutrons, comprising:

a plurality of individual unit Fresnel lenses comprising a total of N in number, said unit lenses hereinafter designated individually with numbers i=1 through N, said unit lenses substantially aligned along an axis, said i-th lens having a displacement $t_i$ orthogonal to said axis, with said axis located such that $$\sum_{i=1}^{N} t_i = 0,$$

and;

wherein each of said unit lenses comprises a lens material having a refractive index decrement $\delta<1$ at a wavelength $\lambda<200$ Angstroms; and wherein said displacements $t_i$ are distributed such that there is a standard deviation $\sigma_t$ of said displacements $t_i$ about said axis, and wherein each said unit lens has n zones, and wherein each said unit lens has a smallest Fresnel zone width of $s_n-s_{n-1}$, where $s_n$ and $s_{n-1}$ are the zone radii of the n and n−1 zones and the standard deviation is $\sigma_t \leqq [s_n-s_{n-1}]/4$.

2. A neutron compound refractive lens as in claim 1 wherein the total phase change of a neutron wave along the length of the neutron compound refractive lens at each of the zone radii, $s_1$, at the neutron wavelength of operation is $2n\pi$ where n=1, 2, 3.

3. A neutron compound refractive lens according to claim 1 wherein at least one of the plurality of unit lenses has a refractive Fresnel shape that is fabricated by at least one of the following techniques: optical, lithographic, LIGA, mechanical, diamond turning, compression, and injection molding.

4. A neutron compound refractive lens according to claim 1 wherein the plurality of the unit Fresnel lenses are cylindrical and focus in one dimension.

5. A neutron compound refractive lens according to claims 1 wherein the unit lenses are held by a cylindrical alignment fixture such that the unit lenses have an average optical axis.

6. A neutron compound refractive lens according to claim 1, wherein the unit lenses are held and aligned by two or more alignment pins or rods such that the unit lenses have an average optical axis.

7. A neutron compound refractive according to claims 1 wherein the unit lenses are aligned and held together using an adhesive, welding or other fastening techniques.

8. A neutron lens system comprising a plurality of neutron refractive lenses whose focal lengths and separation are chosen such that said neutron lens system has a focal length that varies <5%, when illuminated with neutrons having a bandwidth $\Delta\lambda/\lambda>10\%$.

9. A neutron beam conditioning and monochromatizing instrument, for use with a neutron source having a wavelength <100 Åand a bandwidth $\Delta\lambda/\lambda$, comprising:

a neutron compound refractive lens which produces an image of the neutron source at an image plane; and an aperture, positioned at said image plane, wherein said neutron compound refractive lens and said aperture act to narrow said bandwidth $\Delta\lambda/\lambda$.

10. A neutron microscope comprising:

a neutron source for illuminating a specimen;

a neutron compound refractive lens of focal length, f, having an image at an image distance i from said lens, wherein said lens is placed a distance o downstream from the specimen such that the focal length of the neutron compound refractive lens and the distances i and o are related by 1/o+1/i=1/f, resulting in a magnification M=i/o; and a neutron sensitive detector placed at the image.

11. A neutron microscope as in claim 10 further comprising a condenser optic configured as a second neutron compound refractive lens or a neutron reflective optic, positioned such that said condenser optic collects and focuses the neutron beam from the neutron source.

12. A neutron microscope as in claim 11 wherein said neutron compound refractive lens further comprises an achromatic compound refractive lens pair whose focal lengths are chosen and whose separation is adjusted so as to have a combined focal length of the pair that varies <5%, when illuminated with neutrons having a bandwidth $\Delta\lambda/\lambda > 10\%$.

13. A neutron microscope as in claim 12 further comprising an aperture, positioned at an image plane where the neutron compound refractive lens produces an image of the neutron source.

14. A neutron microscope as in claim 11 further comprising:

an annular condenser optic upstream of said compound refractive lens;

a semi-transparent phase plate located downstream of said compound refractive lens.

15. A neutron microscope as in claims 11 further comprising an annular diaphram downstream of said condenser optic;

a semi-transparent phase plate located downstream of said compound refractive lens.

16. A neutron microscope as in claim 14 further comprising an annular diaphram downstream of said condenser optic.

* * * * *